United States Patent
Wucher et al.

(10) Patent No.: US 11,423,697 B1
(45) Date of Patent: Aug. 23, 2022

(54) MACHINE LEARNING ARCHITECTURE FOR IMAGING PROTOCOL DETECTOR

(71) Applicant: SDC U.S. SMILEPAY SPV, Nashville, TN (US)

(72) Inventors: Tim Wucher, Windhoek (NA); Ryan Amelon, Nashville, TN (US); Jordan Katzman, Nashville, TN (US); Aleksey Gurtovoy, Nashville, TN (US)

(73) Assignee: SDC U.S. SMILEPAY SPV, Nashville, TN (US)

( * ) Notice: Subject to any disclaimer, the term of this patent is extended or adjusted under 35 U.S.C. 154(b) by 0 days.

(21) Appl. No.: 17/401,053

(22) Filed: Aug. 12, 2021

(51) Int. Cl.
| | | |
|---|---|---|
| *G06V 40/16* | (2022.01) | |
| *G06N 20/00* | (2019.01) | |
| *G06T 7/00* | (2017.01) | |
| *G06V 20/40* | (2022.01) | |

(52) U.S. Cl.
CPC .......... *G06V 40/171* (2022.01); *G06N 20/00* (2019.01); *G06T 7/0002* (2013.01); *G06V 20/41* (2022.01); *G06V 20/46* (2022.01); *G06T 2207/20081* (2013.01); *G06T 2207/30168* (2013.01); *G06T 2207/30201* (2013.01)

(58) Field of Classification Search
CPC .......... G06K 9/00281; G06K 9/00718; G06K 9/00744; G06N 20/00; G06T 7/0002; G06T 2207/20081; G06T 2207/30168; G06T 2207/30201
See application file for complete search history.

(56) References Cited

U.S. PATENT DOCUMENTS

| | | | |
|---|---|---|---|
| 10,159,541 B2 | 12/2018 | Bindayel | |
| 10,595,966 B2* | 3/2020 | Carrier, Jr | A61C 7/002 |
| 10,849,723 B1 | 12/2020 | Yancey et al. | |
| 10,878,566 B2 | 12/2020 | Kumar et al. | |
| 10,932,885 B2* | 3/2021 | Carrier, Jr | A61C 19/04 |
| 2008/0280247 A1 | 11/2008 | Sachdeva et al. | |
| 2009/0148805 A1 | 6/2009 | Kois | |
| 2013/0336527 A1* | 12/2013 | Nechyba | H04N 5/23219 382/103 |
| 2014/0185931 A1 | 7/2014 | Aoki | |
| 2014/0272765 A1* | 9/2014 | Andreiko | A61B 1/00006 433/27 |
| 2014/0327940 A1* | 11/2014 | Amtrup | G06K 9/18 358/473 |
| 2016/0050363 A1* | 2/2016 | Stubler | G06K 9/52 348/222.1 |
| 2016/0128624 A1 | 5/2016 | Matt | |

(Continued)

OTHER PUBLICATIONS

Chen et al., "Learning to Predict 3D Objects with an Interpolation-based Differentiable Renderer" Nov. 2019; 11 Pages.

(Continued)

*Primary Examiner* — Ian L Lemieux
(74) *Attorney, Agent, or Firm* — Foley & Lardner LLP

(57) ABSTRACT

Disclosed is a machine learning architecture for a two-dimensional image protocol detector configured to receive a first image representing at least a portion of a mouth of a user, and output user feedback for capturing a second image representing a portion of the mouth of the user, where the machine learning architecture outputs the user feedback in response to an image quality score of the first image not satisfying an image quality threshold.

23 Claims, 14 Drawing Sheets

(56) References Cited

U.S. PATENT DOCUMENTS

| | | |
|---|---|---|
| 2016/0246936 A1 | 8/2016 | Kahn |
| 2018/0189549 A1* | 7/2018 | Inomata ................. G06T 19/006 |
| 2018/0352150 A1* | 12/2018 | Purwar .............. G06K 9/00255 |
| 2019/0090993 A1 | 3/2019 | Engelmohr et al. |
| 2019/0147666 A1 | 5/2019 | Keustermans et al. |
| 2019/0180443 A1 | 6/2019 | Xue et al. |
| 2019/0282344 A1 | 9/2019 | Azernikov et al. |
| 2019/0295223 A1 | 9/2019 | Shen et al. |
| 2020/0085546 A1 | 3/2020 | Li et al. |
| 2020/0352686 A1* | 11/2020 | Yancey ................... A61C 7/002 |
| 2020/0360109 A1 | 11/2020 | Gao et al. |
| 2020/0364860 A1 | 11/2020 | Kearney et al. |
| 2020/0383758 A1 | 12/2020 | Yancey et al. |
| 2020/0387829 A1 | 12/2020 | Kearney et al. |
| 2020/0390522 A1 | 12/2020 | Pokotilov et al. |
| 2020/0411167 A1 | 12/2020 | Kearney et al. |
| 2021/0019885 A1* | 1/2021 | Jeanne ....................... G06T 7/90 |
| 2021/0052138 A1* | 2/2021 | Bevis ................... A61B 5/6898 |
| 2021/0068923 A1 | 3/2021 | Carrier et al. |

OTHER PUBLICATIONS

L. Pingali, "Personal Oral Health Advisor Using Multimodal Sensing and Machine Learning with Smartphones and Cloud Computing," 2019 IEEE International Conference on Cloud Computing in Emerging Markets (CCEM), 2019, pp. 17-24, doi: 10.1109/CCEM48484.2019.000-3.

Miki et al., "Tooth labeling in cone-beam CT using deep convolutional neural network for forensic identification", Proc. SPIE 10134, Medical Imaging 2017: Computer-Aided Diagnosis, 101343E (Mar. 3, 2017); https://doi.org/10.1117/12.2254332, 6 pages.

\* cited by examiner

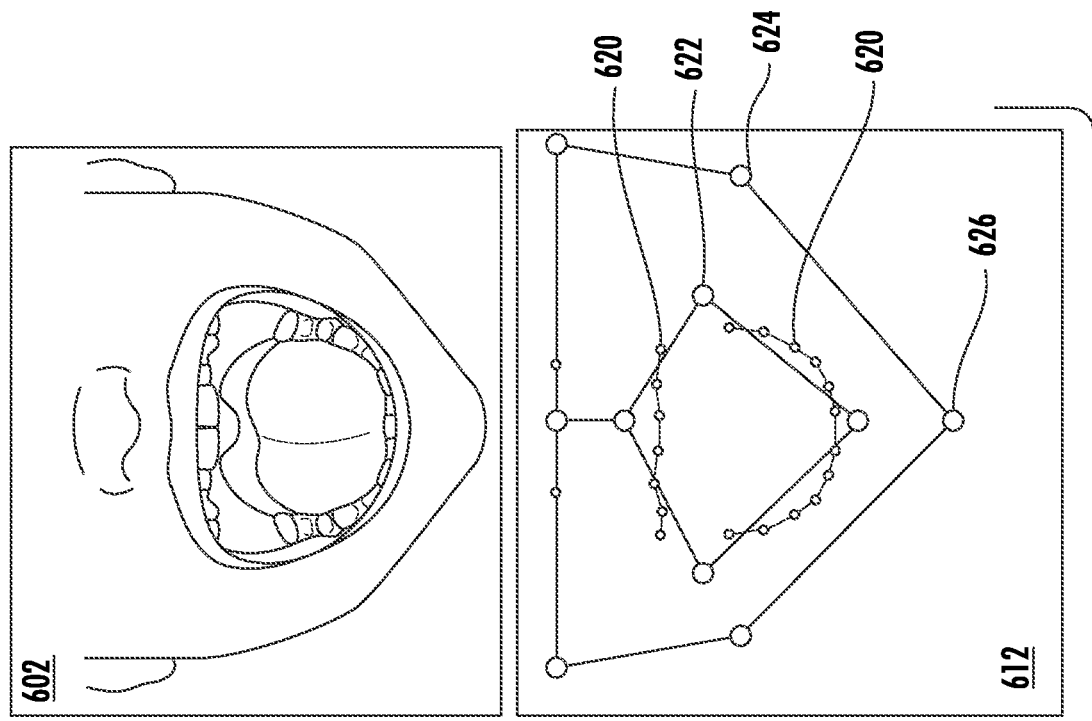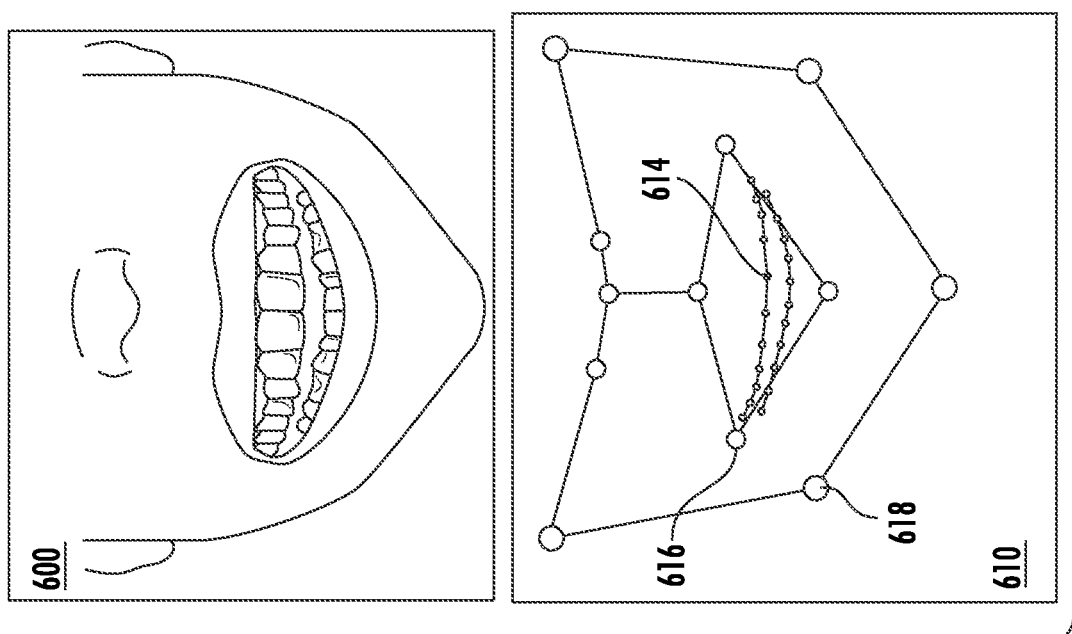
FIG. 6

MACHINE LEARNING ARCHITECTURE FOR IMAGING PROTOCOL DETECTOR

TECHNICAL FIELD

The present disclosure relates generally to a machine learning architecture for intelligently processing two-dimensional images captured of a user's mouth, and interactively communicating with the user in order to receive improved two-dimensional images of the user's mouth.

BACKGROUND

High quality images of a user's mouth (e.g., mouth data, including dental and intra-oral data) can be captured using hardware and software to reveal, highlight, accentuate, or distinguish relevant portions of the user's mouth by widening the opening defining the user's mouth or by keeping the user's mouth sufficiently open for capturing images. However, not all users have access to such hardware, and further such hardware does not ensure that images of sufficient quality (e.g., high quality images) are ultimately captured. Accordingly, it can be difficult for users to capture high quality images of a user's mouth. Alternatively, trained professionals can advise and assist a user by positioning hardware or the user's face, or by operating an imaging device. However, visiting a trained professional is often not convenient for users, not preferred by users, and can be expensive.

SUMMARY

An embodiment relates to a system. The system includes a capture device configured to capture a first image representing at least a portion of a mouth of a user. The system also includes a communication device configured to communicate user feedback to the user. The system also includes a processor and a non-transitory computer-readable medium containing instructions that when executed by the processor causes the processor to perform operations. Operations performed by the processor include receiving the first image representing at least the portion of the mouth of the user. Additional operations performed by the processor include outputting user feedback for capturing a second image representing at least a portion of the mouth of the user, where the user feedback is output in response to using a machine learning architecture to determine that an image quality score of the first image does not satisfy an image quality threshold.

Another embodiment relates to a method. The method includes receiving, by an imaging protocol algorithm executing on one or more processors, a first image representing at least a portion of a mouth of a user. The method also includes outputting, by the machine learning architecture executing on the one or more processors, user feedback for capturing a second image representing a portion of the mouth of the user, where the machine learning architecture outputs the user feedback in response to an image quality score of the first image not satisfying an image quality threshold.

Another embodiment relates to a system. The system includes a communication device configured to capture a first image representing at least a portion of a mouth of a user and communicate the first image to a server. The system also includes a processor of the server and a non-transitory computer-readable medium containing instructions that when executed by the processor causes the processor to perform operations. Operations performed by the processor include receiving the first image representing at least the portion of the mouth of the user. Additional operations performed by the processor include communicating, to the communication device, user feedback for capturing a second image representing at least a portion of the mouth of the user, where the user feedback is determined in response to determining via an imaging protocol algorithm that an image quality score of the first image does not satisfy an image quality threshold.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

Various example embodiments of the present solution are described in detail below with reference to the following figures or drawings. The drawings are provided for purposes of illustration only and merely depict example arrangements of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIG. 6 is series of images and corresponding landmarked models, according to an illustrative embodiment.

DETAILED DESCRIPTION

Figure 1:
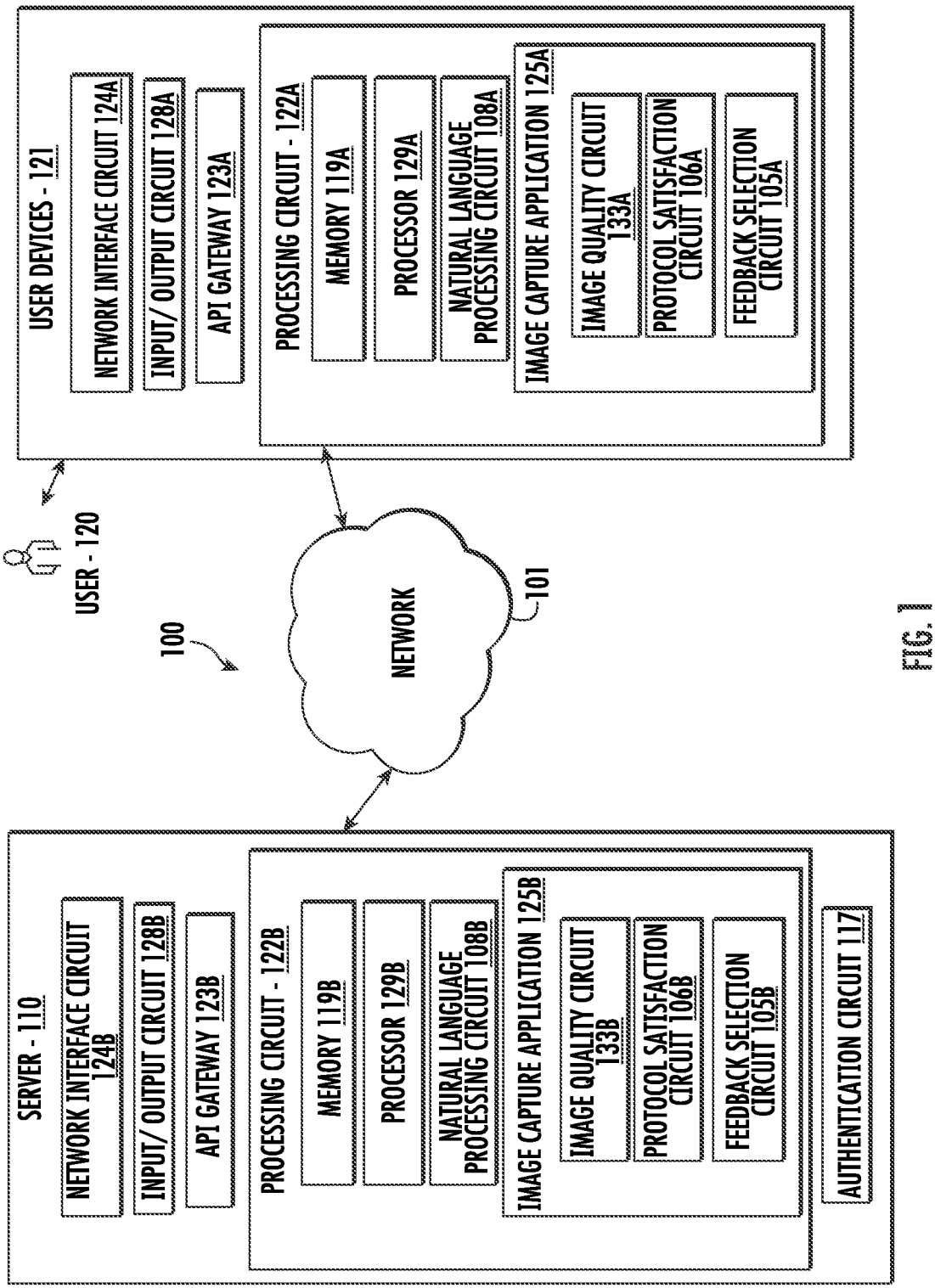
FIG. 1 is a block diagram of a computer-implemented system including an image capture application utilizing a machine learning architecture, according to an illustrative embodiment.

Hereinafter, example arrangements will be described in more detail with reference to the accompanying drawings, in which like reference numbers refer to like elements throughout. The present disclosure, however, can be embodied in various different forms, and should not be construed as being limited to only the illustrated arrangements herein. Rather, these arrangements are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description.

The systems and method described herein may have many benefits over existing computing systems. For example, a machine learning architecture improves a user experience associated with capturing high quality images of the user's mouth by reducing costs and time associated with a user visiting trained professionals by communicating relevant feedback to the user in a user-friendly way. The interactive user-specific feedback provided to the user improves the quality of images captured by the user while decreasing the time and effort that the user spends before capturing the high quality image. For instance, the characteristics of the image (e.g., contrast, sharpness, brightness, blur) and the content of the image (visibility of teeth, mouth angle, tongue position) are evaluated by the machine learning architecture to determine whether the captured image is a high quality image. The embodiments also improve the user experience by communicating user-specific feedback. That is, the feedback incorporates available user hardware, it is directed to facilitating a particular user in capturing a high quality image in response to a received image, and it is heterogeneously communicated to the user according to user preferences. Communicating user-specific feedback reduces computational resources consumed by a system that would otherwise communicate general feedback by limiting the number of iterations necessary to capture a high quality image of the user's mouth. For example, computational resources are conserved by systems by not continuously communicating general and/or standard feedback to the user in an attempt to guide the user to capture a high quality image.

Referring now to FIG. 1, a block diagram of a computer-implemented system 100 including an image capture application utilizing a machine learning architecture is shown, according to an embodiment. The system 100 includes user device 121 and server 110. Devices and components in FIG. 1 can be added, deleted, integrated, separated, and/or rearranged in various embodiments of the disclosed inventions. For example, some components of FIG. 1 are illustrated as being executed on the user device 121. For example, latency may be reduced by providing user feedback to the user using the user device 121. However, in some implementations, the user device 121 may be used to capture an image, and the image may be transmitted to the server 110 for processing and for providing a user feedback recommendation. That is, the circuits of the user device 121 may be performed on the server 110. Components of the user device 121 and/or server 110 may be locally installed (on the user device 121 and/or server 110), and/or may be remotely accessible (e.g., via a browser based interface or a cloud system).

The various systems and devices may be communicatively and operatively coupled through a network 101. Network 101 may permit the direct or indirect exchange of data, values, instructions, messages, and the like (represented by the arrows in FIG. 1). The network 101 may include one or more of the Internet, cellular network, Wi-Fi, Wi-max, a proprietary network, or any other type of wired or wireless network of a combination of wired or wireless networks.

The user 120 may be any person using the user device 121. Such a user 120 may be a potential customer, a customer, client, patient, or account holder of an account stored in server 110 or may be a guest user with no existing account. The user device 121 includes any type of electronic device that a user 120 can access to communicate with the server 110. For example, the user device 121 may include watches (e.g., a smart watch), and computing devices (e.g., laptops, desktops, personal digital assistants (PDAs), mobile devices (e.g., smart phones)).

The server 110 may be associated with or operated by a dental institution (e.g., a dentist or an orthodontist, a clinic, a dental hardware manufacturer). The server 110 may maintain accounts held by the user 120, such as personal information accounts (patient history, patient issues, patient preferences, patient characteristics). The server 110 may include server computing systems, for example, comprising one or more networked computer servers having a processor and non-transitory machine readable media.

As shown, both the user device 121 and the server 110 may include a network interface (e.g., network interface 124A at the user device 121 and network interface 124B at the server 110, hereinafter referred to as "network interface 124"), a processing circuit (e.g., processing circuit 122A at the user device 121 and processing circuit 122B at the server 110, hereinafter referred to as "processing circuit 122"), an input/output circuit (e.g., input/output circuit 128A at the user device 121 and input/output circuit 128B at the server 110, hereinafter referred to as "input/output circuit 128"), an application programming interface (API) gateway (e.g., API gateway 123A at the user device 121 and API gateway 123B at the server 110, hereinafter referred to as "API gateway 123"), and an authentication circuit (e.g., authentication circuit 117A at the user device 121 and authentication circuit 117B at the server 110, hereinafter referred to as "authentication circuit 117"). The processing circuit 122 may include a memory (e.g., memory 119A at the user device 121 and memory 119B at the server 110, hereinafter referred to as "memory 119"), a processor (e.g., processor 129A at the user device 121 and processor 129B at the server 110, hereinafter referred to as "processor 129"), an image capture application (e.g., image capture application 125A at the user device 121 and image capture application 125B at the server 110, hereinafter referred to as "image capture application 125"), and a natural language processing (NLP) circuit (e.g., NLP circuit 108A at the user device 121 and NLP circuit 108B at the server 110, hereinafter referred to as "NLP circuit 108").

The network interface circuit 124 may be adapted for and configured to establish a communication session via the network 101 between the user device 121 and the server 110. The network interface circuit 124 includes programming and/or hardware-based components that connect the user device 121 and/or server 110 to the network 101. For example, the network interface circuit 124 may include any combination of a wireless network transceiver (e.g., a cellular modem, a Bluetooth transceiver, a Wi-Fi transceiver) and/or a wired network transceiver (e.g., an Ethernet transceiver). In some arrangements, the network interface circuit 124 includes the hardware and machine-readable media structured to support communication over multiple channels of data communication (e.g., wireless, Bluetooth, near-field communication, etc.).

Further, in some arrangements, the network interface circuit 124 includes cryptography module(s) to establish a secure communication session (e.g., using the IPSec protocol or similar) in which data communicated over the session is encrypted and securely transmitted. In this regard, personal data (or other types of data) may be encrypted and transmitted to prevent or substantially prevent the threat of hacking or unwanted sharing of information.

To support the features of the user device 121 and/or server 110, the network interface circuit 124 provides a relatively high-speed link to the network 101, which may be any combination of a local area network (LAN), the Internet, or any other suitable communications network, directly or through another interface.

The input/output circuit 128A at the user device 121 may be configured to receive communication from a user 120 and provide outputs to the user 120. Similarly, the input/output circuit 128B at the server 110 may be configured to receive communication from an administrator (or other user such as a medical professional, such as a dentist, orthodontist, dental technician, or administrator) and provide output to the user. For example, the input/output circuit 128 may capture user responses based on a selection from a predetermined list of user inputs (e.g., drop down menu, slider, buttons), an interaction with a microphone on the user device 121, or an interaction with a graphical user interface (GUI) displayed on the user device 121 (e.g., as described in FIGS. 10-12), an interaction with a light sensor, an interaction with an accelerometer, and/or an interaction with a camera. For example, a user 120 using the user device 121 may capture an image of the user 120 using a camera. The image of the user may be ingested by the user device 121 using the input/output circuit 128. Similarly, a user device 121 may interact with the light sensors on the user device such that the light sensors can collect data to determine whether the user device 121 is facing light. Further, a user 120 may interact with the accelerometer such that the accelerometer may interpret measurement data to determine whether the user 120 is shaking the user device 121, and/or may provide feedback regarding the orientation of the device and whether the user 120 is modifying the orientation of the user device 121. Feedback associated with the captured image may be output to the user using the input/output circuit 128. For example, the image capture application 125 may provide audible feedback to the user using speakers on the user device 121. Additionally or alternatively, the user 120 may interact with the GUI executed by the user device 121 using the user's 120 voice, a keyboard/mouse (or other hardware), and/or a touch screen.

The API gateway 123 may be configured to facilitate the transmission, receipt, authentication, data retrieval, and/or exchange of data between the user device 121, and/or server 110.

Generally, an API is a software-to-software interface that allows a first computing system of a first entity (e.g., the user device 121) to utilize a defined set of resources of a second (external) computing system of a second entity (e.g., the server 110, or a third party) to, for example, access certain data and/or perform various functions. In such an arrangement, the information and functionality available to the first computing system is defined, limited, or otherwise restricted by the second computing system. To utilize an API of the second computing system, the first computing system may execute one or more APIs or API protocols to make an API "call" to (e.g., generate an API request that is transmitted to) the second computing system. The API call may be accompanied by a security or access token or other data to authenticate the first computing system and/or a particular user 120. The API call may also be accompanied by certain data/inputs to facilitate the utilization or implementation of the resources of the second computing system, such as data identifying users 120 (e.g., name, identification number, biometric data), accounts, dates, functionalities, tasks, etc.

The API gateway 123 in the user device 121 provides various functionality to other systems and devices (e.g., server 110) through APIs by accepting API calls via the API gateway 123. The API calls may be generated via an API engine of a system or device to, for example, make a request from another system or device.

For example, the image capture application 125B at the server 110 and/or a downstream application operating on the server 110 may use the API gateway 123B to communicate with the image capture application 125A. The communication may include commands to control the image capture application 125A. For example, a circuit of the image capture application 125B (e.g., the image quality circuit 133B, the protocol satisfaction circuit 106B and/or the feedback selection circuit 105B) may result in (or produce an output) that may start/stop a process (e.g., start or stop an image capture process), or receive automated commands of the image capture application 125A. Similarly, upon the downstream application or image capture application 125B determining a certain result (e.g., a captured high quality image), the downstream application and/or image capture application 125B may send a command to the image capture application 125A via the API gateway to perform a certain operation (e.g., turn off an active camera at the user device 121).

The processing circuit 122 may include at least memory 119 and a processor 129. The memory 119 includes one or more memory devices (e.g., RAM, NVRAM, ROM, Flash Memory, hard disk storage) that store data and/or computer code for facilitating the various processes described herein. The memory 119 may be or include tangible, non-transient volatile memory and/or non-volatile memory. The memory 119 stores at least portions of instructions and data for execution by the processor 129 to control the processing circuit 122. For example, memory 119 may serve as a repository for user 120 accounts (e.g., storing user 120 name, email address, physical address, phone number, medical history), training data, thresholds, weights, and the like for the machine learning models. In other arrangements, these and other functions of the memory 119 are stored in a remote database.

The processor 129 may be implemented as a general-purpose processor, an application specific integrated circuit (ASIC), one or more field programmable gate arrays (FPGAs), a digital signal processor (DSP), a group of processing components, or other suitable electronic processing components.

The NLP circuit 108 in the processing circuit 112 may include computer-executable instructions structured to determine information extracted from an audio signal from the user 120. For example, the NLP circuit 108 may be used to interpret user inputs when the user 120 is interacting with the image capture application 125 orally. For instance, the user 120 may hold the user device 121 (e.g., at a particular position in air) and speak into a microphone or other component of the input/output circuit 128 on the user device 121. In an example, the user 120 may request that the image capture application 125 repeat the user feedback. In some configurations, the NLP circuit 108 may parse the audio signal into audio frames containing portions of audio data. The frames may be portions or segments of the audio signal having a fixed length across the time series, where the length of the frames may be pre-established or dynamically determined.

The NLP circuit 108 may also transform the audio data into a different representation. For example, the NLP circuit 108 initially generates and represents the audio signal and frames (and optionally sub-frames) according to a time domain. The NLP circuit 108 transforms the frames (initially in the time domain) to a frequency domain or spectrogram representation, representing the energy associated with the frequency components of the audio signal in each of the frames, thereby generating a transformed representation. In some implementations, the NLP circuit 108 executes a Fast-Fourier Transform (FFT) operation of the frames to transform the audio data in the time domain to the frequency domain. For each frame (or sub-frame), the NLP circuit 108 may perform a simple scaling operation so that the frame occupies the range $[-1, 1]$ of measurable energy.

In some implementations, the NLP circuit 108 may employ a scaling function to accentuate aspects of the speech spectrum (e.g., spectrogram representation). The speech spectrum, and in particular the voiced speech, will decay at higher frequencies. The scaling function beneficially accentuates the voiced speech such that the voice speech is differentiated from background noise in the audio signal. The NLP circuit 108 may perform an exponentiation operation on the array resulting from the FFT transformation to further distinguish the speech in the audio signal from background noise. The NLP circuit 108 may employ automatic speech recognition and/or natural language processing algorithms to interpret the audio signal.

The authentication circuit 117 of the server 110 may be configured to authenticate the user 120 by authenticating information received by the user device 121. The authentication circuit 117 authenticates a user 120 as being a valid account holder associated with the server 110 (and/or the image capture application 125). In some embodiments, the authentication circuit 117 may prompt the user 120 to enter user 120 credentials (e.g., username, password, security questions, and biometric information such as fingerprints or facial recognition). The authentication circuit 117 may look up and match the information entered by the user 120 to stored/retrieved user 120 information in memory 119. For example, memory 119 may contain a lookup table matching user 120 authentication information (e.g., name, home address, IP address, MAC address, phone number, biometric data, passwords, usernames) to user 120 accounts and user 120 personal information (e.g., medical information).

The user device 121 and/or server 110 are configured to run a variety of application programs and store associated data in a database of the memory 119. One such application executed by the user device 121 and/or server 110 using the processing circuit 122 may be the image capture application 125. The image capture application 125 is structured to guide a user (e.g., user 120 using a user device 121) to capture images. The image capture application 125 may utilize and/or instruct other circuits on the user device 121 such as components of the input/output circuit 128 (e.g., a display of the user device 121, a microphone on the user device 121, a camera on the user device 121). For example, executing the image capture application 125 may result in displaying a user interface (e.g., a graphical user interface such as FIGS. 6A-6D). In some embodiments, data captured at the image capture application 125A at the user device 121 is communicated to the image capture application 125B at the server 110.

The image capture application 125 is a downloaded and installed application that includes program logic stored in a system memory (or other storage location) of the user device 121 that includes an image quality circuit 133, a protocol satisfaction circuit 106, and a feedback selection circuit 105. In this embodiment, the image quality circuit 133, protocol satisfaction circuit 106, and feedback selection circuit 105 are embodied as program logic (e.g., computer code, modules, etc.). The image capture application 125A is communicably coupled via the network interface circuit 124A over the network 101 to the server 110 and, particularly to the image capture application 125B that may support at least certain processes and functionalities of the image capture application 125A. Similarly, the image capture application 125B is communicably coupled via the network interface circuit 124B over the network 101 to the user device 121, and particularly to the image capture application 125A. In some embodiments, during download and installation, the image capture application 125A is stored by the memory 119A of the user device 121 and selectively executable by the processor 129A. Similarly, in some embodiments, the image capture application 125B is stored by the memory 119B of the server 110 and selectively executable by the processor 129B. The program logic may configure the processor 129 (e.g., processor 129A of the user device 121 and processor 129B of the server 110) to perform at least some of the functions discussed herein. In some embodiments the image capture application 125 is a stand-alone application that may be downloaded and installed on the user device 121 and/or server. In other embodiments, the image capture application 125 may be a part of another application.

The depicted downloaded and installed configuration of the image capture application 125 is not meant to be limiting. According to various embodiments, parts (e.g., modules, etc.) of the image capture application 125 may be locally installed on the user device 121/server 110 and/or may be remotely accessible (e.g., via a browser-based interface) from the user device 121/server 110 (or other cloud system in association with the server 110). In this regard and in another embodiment, the image capture application 125 is a web-based application that may be accessed using a browser (e.g., an Internet browser provided on the user device). In still another embodiment, the image capture application 125 is hard-coded into memory such as memory 119 of the user device 121/server 110 (i.e., not downloaded for installation). In an alternate embodiment, the image capture application 125 may be embodied as a "circuit" of the user device 121 as circuit is defined herein.

The image capture application 125 may be configured to guide the user and control the data capture process in order to capture high quality data. The image capture application 125 guides the user 120 such that the feedback provided to the user is minimized to obtain the desired image (e.g., an image that satisfies both an image quality threshold associated with image characteristics and an image quality threshold associated with image content). That is, the user 120 is guided to capture high quality image data using feedback selected by the image capture application 125 (e.g., user feedback). The feedback selected by the image capture application 125 minimizes the number of attempts (or duration of time) that the user 120 spends attempting to capture a high quality image, minimizes the effort required by the user 120 to capture high quality images, and/or improves the user 120 experience with the image capture application 125.

For example, the image capture application 125 may request user feedback quantifying the user experience with the image capture application 125. User feedback quantifying the user experience with the image capture application 125 may include a user's rating of the image capture application indicating the effort the user 120 experienced, the frustration the user 120 experienced, the satisfaction with the instructions provided by the image capture application 125, and the like. The image capture application 125 may determine the user 120 experience associated with using the image capture application 125 by statistically or algorithmically combining the user feedback quantifying the user 120 experience with the image capture application 125 and comparing the user feedback against a preconfigured positive user experience threshold.

The operations performed by the image capture application 125 may be executed at the user device 121, at the server 110, and/or using some combination of the user device 121 and the server 110. For example, the image capture application 125 may be executed both at the user device 121 (e.g., image capture application 125A) and the server 110 (e.g., image capture application 125B). In other implementations, the image capture application may be executed partially at the user device 121 and partially at the server 110. Additionally or alternatively, the image capture application 125 may be executed completely in the user device 121 (or server 110), and in some implementations may be run subsequently at the server 110 (or user device 121). In some implementations, the image capture application 125A may run in parallel with the image capture application 125B.

For example, to reduce the latency associated with providing feedback to the user 120, the image capture application 125 may be executed on the user device 121 such that the user 120 receives feedback related to improving the captured image in real time. That is, the time associated with the user waiting to receive feedback may be minimized (or reduced). In other implementations, a first image capture application may be executed (e.g., the image capture application 125A on the user device 121) to provide simple feedback, and a second image capture application may be executed (e.g., the image capture application 125B on the server 110) to provide more sophisticated feedback to the user 120.

The image capture application includes an image quality circuit 133. The image quality circuit 133 may evaluate the quality of a captured image (or a frame of a video data stream) with respect to the characteristics of the image. The quality of the image with respect to the characteristics of the image includes the visibility of the image (e.g., lightness/darkness in the image, shadows in the image), the contrast of the image, the saturation of an image, the sharpness of time image, and/or the blur of the image (e.g., motion artifacts), and/or the noise or distortion of an image, for instance.

The image quality circuit 133 may evaluate the quality of the image with respect to the characteristics of the image using a machine learning model. In one example implementation, the image quality circuit 133 may implement a Blind/Referenceless Image Spatial Quality Evaluator (BRISQUE) model. BRISQUE models are beneficial because the quality of an image affected by an unknown distortion can be evaluated. That is, the characteristics of the image (e.g., blue, contrast, brightness), do not need to be labeled/classified before the quality of the image is determined. Further, BRISQUE can be performed quickly (e.g., in real time or near real time) because of its low computational complexity.

The BRISQUE model may be trained to evaluate the quality of an image using a dataset including clean images and distorted images (e.g., images affected by pixel noise). The BRISQUE model generates an image score using support vector regression. The training images may be normalized. In some implementations, mean subtracted contrast normalization may be employed to normalize the image. Features from the normalized image may be extracted and transformed into a higher dimension (e.g., mapping the data to a new dimension, employing the "kernel trick" using sigmoid kernels, polynomial kernels, radial basis function kernels, and the like) such that the data is linearly separable. Support vector regression trains/optimizes a hyperplane to model the feature inputs images. The hyperplane may be optimized by taking the gradient of a cost function (such as the hinge loss function) to maximize the margin of the hyperplane. Decision boundaries are determined (based on a tolerance) around the hyperplane.

In some implementations, the image quality circuit 133 can determine the characteristics of specific areas of the image. For example, the image quality circuit 133 may evaluate the image quality for different teeth in the image. In some implementations, the image quality circuit 133 may determine, using the image quality score of specific areas of the image, whether the specific areas of the image are overexposed (or too dark). In one embodiment, the image quality circuit 133 can be applied to the whole or parts of an image. For example, a model can be trained to detect a region of interest (e.g. the inside of the mouth, the molar regions, the tongue, or individual teeth) and the image quality circuit 133 can be applied to each specific region to generate a quality score map on the image. An example of the image quality circuit 133 being applied to one or more parts of the image is described herein with reference to FIG. 14.

Figure 2:
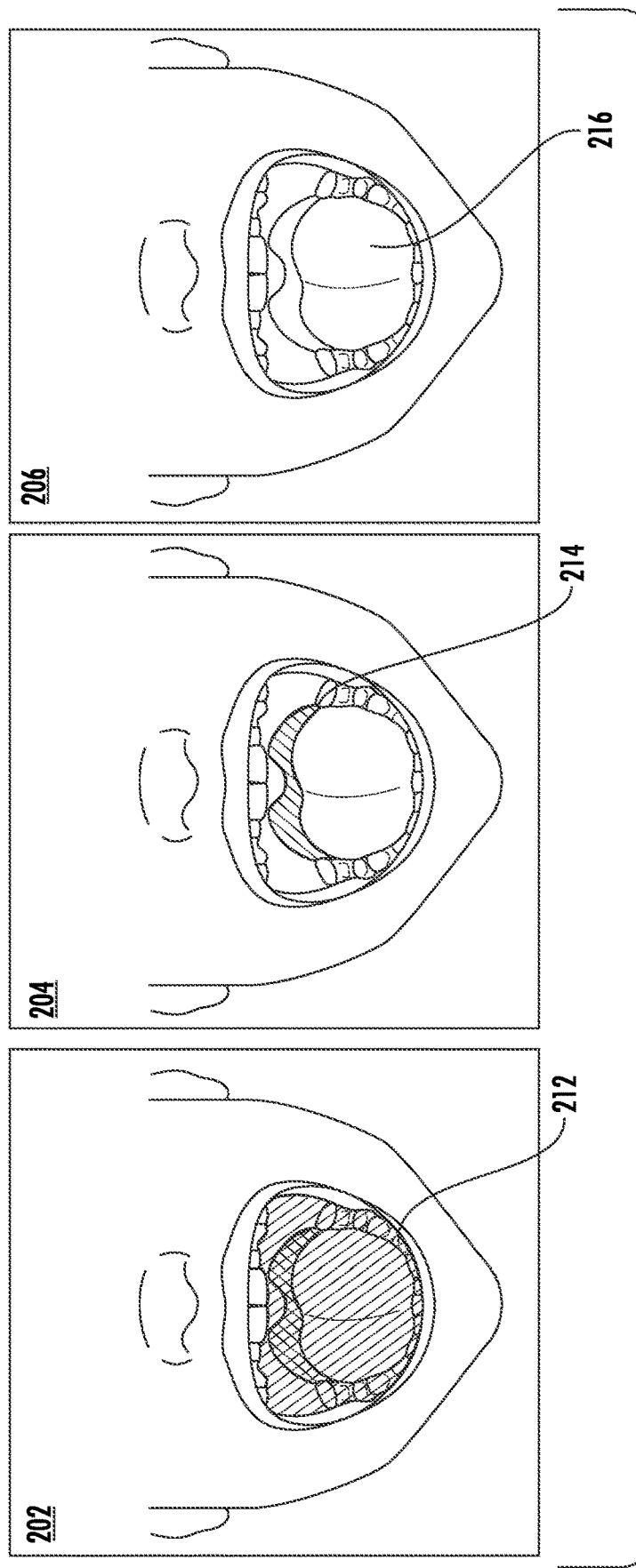
FIG. 2 is a series of images with each image of the series including varying characteristics of an image, according to an illustrative embodiment.

Referring to FIG. 2, illustrated is a series of images with each image of the series including varying characteristics of an image, according to an illustrative embodiment. A first image 202 illustrates that the brightness of the image associated with the user's 120 mouth is too dark 212. A second image 204 illustrates that the brightness of the image associated with the user's 120 mouth is improved from the first image 202, but the brightness of the user's 120 mouth is still too dark 214. A third image 206 illustrates that the brightness of the user's 120 mouth 216 satisfies the image quality threshold associated with the characteristics of the image. For example, as shown, the user's 120 mouth is bright and there is contrast between the teeth and the tongue.

Referring back to FIG. 1, the image capture application includes a protocol satisfaction circuit 106. The protocol satisfaction circuit 106 may evaluate the quality of a captured image (or a frame of a video data stream) with respect to the content of the image. The content of the image may include the prevalence, visibility, distinctiveness and/or relevance of various teeth and/or features in the image. That is, the protocol satisfaction circuit 106 evaluates what is or is not visible (e.g., an absence or presence), the extent (e.g., a degree) of the visibility, an angle, an orientation, and the like.

The protocol satisfaction circuit 106 may evaluate the prevalence, visibility, distinctiveness and/or relevance of features in the image using object detection. For example, the protocol satisfaction circuit 106 may evaluate the angle, visibility, and/or orientation of a user's 120 facial features (e.g., teeth, lips, tongue, eyes, nose, mouth, chin).

The protocol satisfaction circuit 106 may employ any suitable object detection algorithm/model to detect the content of the image. In some embodiments, the protocol satisfaction circuit 106 may be applied to one or more parts of the image as described herein with reference to FIG. 14. One example object detection model of the protocol satisfaction circuit 106 that can operate in real time (or near real time) is the "you only look once" (YOLO) model. The YOLO model employs boundary boxes and class labels to identify objects in an image. The YOLO model is trained using a training dataset including classes identified in training images. For example, an image may be labeled with particular classes (e.g., facial features, such as chin, eyes, lips, nose, teeth) of objects detected in the image. In operation, the YOLO model partitions an image into a grid and determines whether each grid contains a portion of a boundary box and a corresponding likelihood of the boundary box belonging to the particular class.

In one implementation, the protocol satisfaction circuit 106 may employ photogrammetry, for instance, to extract three-dimensional (3D) measurements from captured two-dimensional (2D) images. The protocol satisfaction circuit 106 may perform photogrammetry by comparing known measurements of facial measure with measurements of facial features in an image. The lengths/sizes of various facial features include tooth measurements, lip size measurements, eye size measurements, chin size measurements, and the like. Performing photogrammetry results in the determination of a position, orientation, size, and/or angle of a facial feature in an image. For instance, the roll, pitch, yaw and distance of the user's 120 head may be determined using photogrammetry or one or more other algorithms.

In some configurations, the image capture application 125 may perform photogrammetry using measurements of average facial features (including teeth, chin, lips, eyes, nose) from one or more databases (e.g., server 110 memory 119B) and/or local memory 119A. In other configurations, the image capture application 125 may retrieve particular measurements of a user (e.g., measured when the user 120 was at a medical professional's office) from local memory 119A and/or a database (e.g., server 110 memory 119B). The protocol satisfaction circuit 106 compares the known measurements of facial features with dimensions/measurements of the facial features in the image to determine the position, orientation, size, and/or angle of the facial feature in the image.

The image capture application 125 includes a feedback selection circuit 105. The feedback selection circuit 105 may determine relevant feedback to provide to the user 120, based on the image quality (e.g., the characteristics of the image and the content of the image).

Feedback (e.g., operator/user instructions) is communicated to the user 120 to increase the probability of a subsequent image (or frame) being a high quality image (e.g., satisfying image quality thresholds where the image quality threshold includes image quality thresholds associated with the characteristics of the image and the image quality thresholds associated with the content of the image). The feedback may be communicated to the user 120 visually (e.g., on a screen of the user device 121), audibly (e.g., projected from a speaker of the user device 121), using haptics (e.g., vibrating the user device 121), or any combination. In one implementation, the frequency of vibration may decrease (or increase) when the user 120 adjusts the user device 121 closer to a desired location (resulting in a higher quality image). In other implementations, the user feedback (e.g., the feedback communicated to the user) may indicate that the image is not optimal and/or is more optimal/less optimal from the previous image. In some implementations, memory 119 may store various user preferences associated with the user feedback. For example, a user preference may include only providing user feedback displayed on the user device 121 (e.g., not providing audio user feedback). An example of a different user preference may include providing audio user feedback during certain hours of a day (e.g., from 8 AM to 8 PM) and provide haptic feedback during different hours of a day.

The feedback may be provided to the user based on unique user settings. For example, if the image capture application 125 determined that the user 120 has access to hardware (e.g., object detection is used to detect hardware in the image, the user 120 responded to a prompt and indicated that the user 120 had hardware), then the feedback may incorporate the hardware. The image capture application 125 learns to provide feedback associated with different hardware based on a diverse training set (e.g., receiving images with the hardware, receiving inputs explicitly identifying hardware, and the like). Further, the feedback may be provided to the user 120 based on the region of the user 120, using the language of the user 120, and the like.

Figure 3:
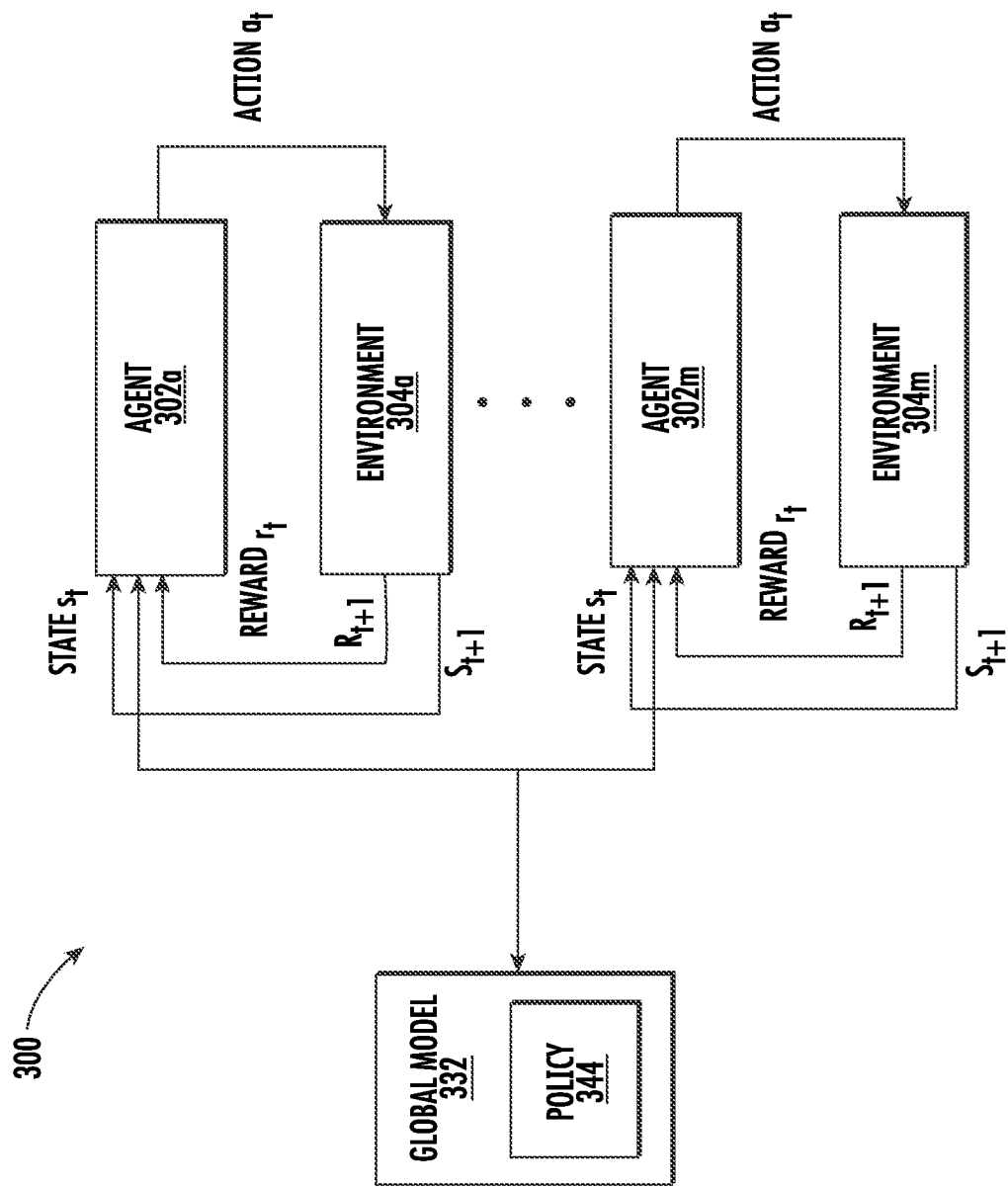
FIG. 3 is an agent-based feedback selection model, according to an illustrative embodiment.

Referring to FIG. 3, an agent-based feedback selection model 300 is shown, according to an illustrative embodiment. The agent-based feedback selection model 300 may be considered a reinforcement learning model, in which a machine learning model uses agents to select actions to maximize rewards based on a policy network.

Agents 302a to 302m (hereinafter called "agents 302") refer to a learner or trainer. The environment 304a to 304m (hereinafter called "environment 304") refers to the quality of the image (e.g., the image characteristics and the image content). At each time step t (e.g., at each iteration), the agent 302 observes a state $s_t$ of the environment 304 and selects an action from a set of actions using a policy 344. The policy 344 maps states and observations to actions. The policy 344 gives the probability of taking a certain action when the agent 302 is in a certain state. The possible set of actions include possible user feedback responses. Using reinforcement learning, for example, given the current state of the environment 304, the agent 302 may recommend a particular user feedback or type of user feedback. In some embodiments, if the image quality score is low (e.g., the image quality threshold associated with image characteristics and the image quality threshold associated with the image content are both not satisfied, or the image quality threshold associated with image characteristics and/or the image quality threshold associated with the image content satisfy a low threshold) then agent 302 may learn to recommend a significant user feedback. An example of significant user feedback may be "open your mouth very wide." In contrast, regular user feedback (or simply "user feedback") may be "open your mouth."

The solution space (e.g., possible set of actions) may be arbitrarily defined and depend on the solution space considerations. For example, the solution space may be discretized such that the possible solutions are fixed rather than on a continuous range. For instance, the action space may include such actions such as: "open your mouth", "say cheese", "move your tongue", "add more light", and the like. The action space may also include more complex schemes such as dual feedback instructions and/or dual step sizes for an explore/exploit approach. For example, the action space may include multiple feedback instructions such as, "open your mouth wide and add more light", "please back up and look towards the camera", and the like. Additionally or alternatively, the action space may include such actions as "please open your mouth a little wider", "please reduce the intensity of the light a little bit", "please get much closer to the camera", and the like.

In some embodiments, the solution space may represent a type of user feedback, and the image capture application 125 may select user feedback randomly or sequentially from a user feedback script (e.g., a dictionary of phrases) associated with the type of user feedback. The user feedback script may be stored in memory 119A of the user device 121 or may be retrieved from memory 119B of the server 110. The user feedback script may be predetermined phrases and/or instructions to be executed by the image capture application 125 when the feedback selection circuit 105 selects the particular type of user feedback. The user feedback script may improve the user experience by making the user feedback more relatable and/or user friendly (e.g., heterogeneous) as opposed to homogenous and static. Further, the user feedback script may be specific to the user 120, the user's 120 language, the user's dialect, the user's 120 age group, or other user preferences.

The feedback script associated with the type of user feedback may be categorized (grouped, or clustered) based on the user feedback type. Accordingly, the agent-based feedback selection model 300 selects the type of user feedback, and the image capture application 125 may select user feedback communicated to the user 120 from the user feedback script.

Figure 4:
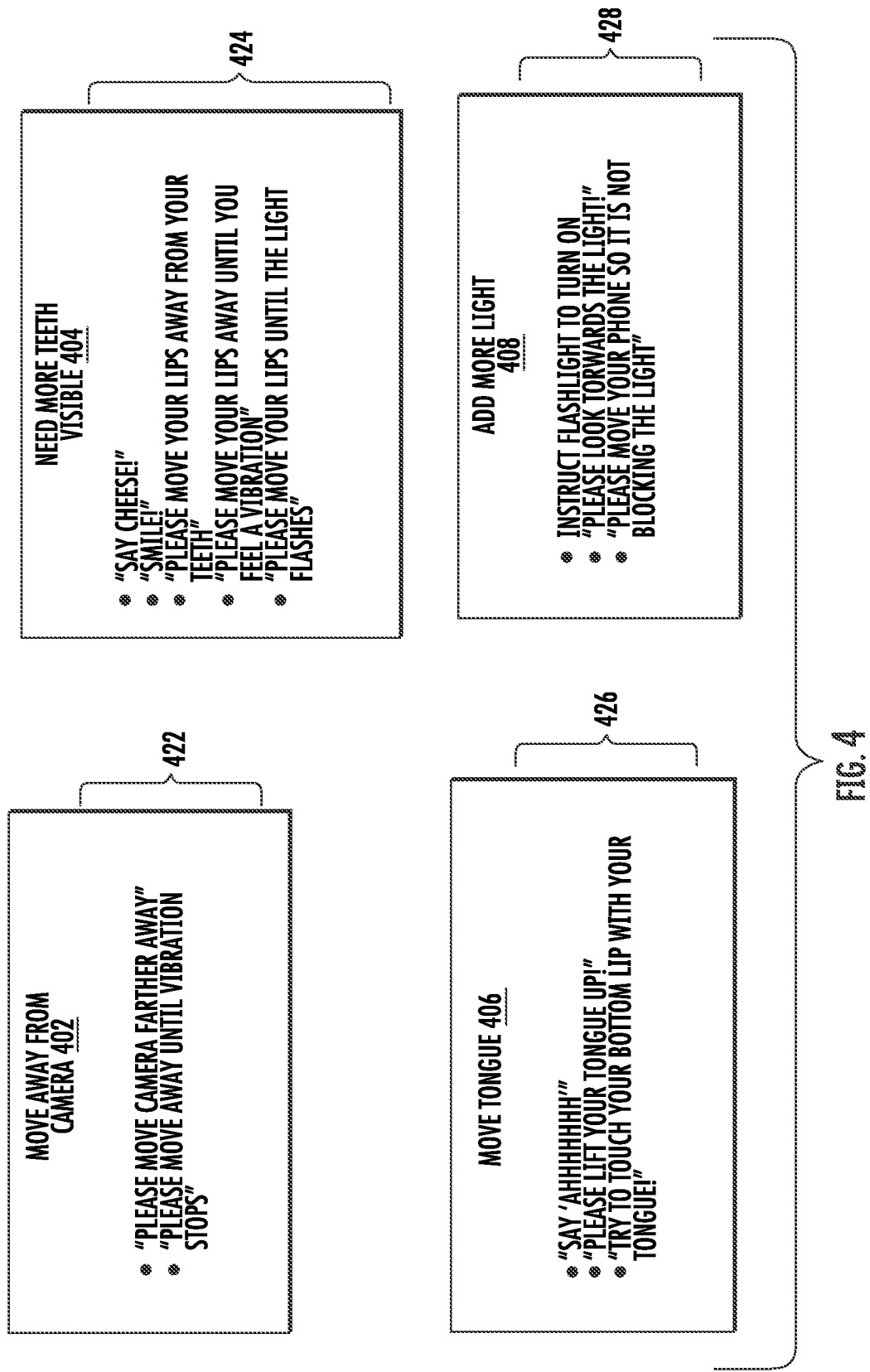
FIG. 4 is an example of types of user feedback and a corresponding user script for each type of user feedback, according to an illustrative embodiment.

Referring to FIG. 4, illustrated is an example of types of user feedback 402-408 and a corresponding user script 422-428 for each type of user feedback, according to an illustrative embodiment. For example, a type of feedback selected by the feedback selection circuit 105 may be the "add more light" user feedback type 408. Accordingly, in response to the user feedback type selected by the feedback selection circuit 105 (e.g., using the agent-based feedback selection model 300), the image capture application 125 selects user feedback communicated to the user 120 from the user feedback script 428 associated with the user feedback type "add more light" 408.

For example, using the script 428 associated with the user feedback type "add more light" 408, the image capture application 125 may output, using a speaker on the user device 121, "please look towards the light!" Additionally or alternatively, the image capture application 125 may instruct the user device 121 to turn on a flashlight on the user device 121.

Referring back to FIG. 3, the solution space of the agent-based feedback selection model 300 may also be continuous rather than discrete. For example, the action space may include such actions as "move the phone two inches left", "move the phone 45 degrees right", "please get 30 centimeters close to the camera", and the like. In the event a continuous solution space is implemented, the agents 302 may need to train for longer such that the agents 302 can determine, for example, a type of user feedback and a severity (or degree) of change to improve the image quality.

As shown, the agent-based feedback selection model 300 may be an asynchronous advantage actor critic reinforcement learning model. That is, policy 344 is a global policy such that the agents 302 share a common policy. The policy 344 is tuned based on the value of taking each action, where the value of selecting an action is defined as the expected reward received when taking that action from the possible set of actions. In some configurations, the image capture application 125 may update the policy 344 using agents operating in other servers (e.g., via federated learning).

The policy 344 may be stored in a global model 332. Using a global model 332 allows each agent 302 to have a more diversified training dataset and eliminates a need for synchronization of models associated with each agent 302. In other configurations, there may be models associated with each agent, and each agent may calculate a reward using a designated machine learning model.

An agent 302 may select actions based on a combination of policy 344 and an epsilon value representative of exploratory actions and exploitation actions. An exploratory action is an action unrestricted by prior knowledge. The exploratory action improves an agent's 302 knowledge about an action by using the explored action in a sequence resulting in a reward calculation. For example, an exploratory action is selecting a user feedback type that may not have been selected in the past. An exploitation action is a "greedy" action that exploits the agent's 302 current action-value estimates. For example, an exploitation action is selecting a user feedback type that has previously resulted in a high reward (e.g., selecting the user feedback type resulted in a subsequently captured high quality image).

Using epsilon-greedy action selection, for example, the agent 302 balances exploratory actions and exploitation actions. The epsilon value may be the probability of exploration versus exploitation. The agent 302 may select an epsilon value and perform an exploitation action or an exploratory action based on the value of the epsilon and one or more exploitation and/or exploration thresholds. The agents 302 may perform exploitation actions and exploration actions based on the value of epsilon. The agents 302 may select an epsilon value and perform an exploitation action or an exploratory action based on the value of the epsilon and one or more exploitation and/or exploration thresholds. The agent 302 may randomly select an epsilon value, select an epsilon value from a predetermined distribution of epsilon values, select an epsilon value in response to the number of training epochs, select an epsilon value in response to one or more gradients, and the like. In some embodiments, as training progresses, exploitation actions may be leveraged to refine training. For example, the image capture application 125 may revise the epsilon value (or epsilon selection) such that the likelihood of the exploration action is higher or lower than the likelihood of the exploitation action. Additionally, or alternatively, the image capture application 125 may revise the exploitation action threshold and/or the exploration action threshold.

In response to selecting an action (or multiple actions) according to the epsilon value and policy 344, the environment 304 may change, and there may be a new state $s_{t+1}$. The agent 302 may receive feedback, indicating how the action affected the environment 304. In some configurations, the agent 302 determines the feedback. In other configurations, the image capture application 125 may provide feedback. For example, if a subsequent image received by the image capture application 125 is a high quality image, then the image capture application 125 can determine that the action resulting in the subsequent image was an appropriate action. That is, the image capture application 125 may determine a positive reward associated with selecting the action.

The agent 302 learns (e.g., reconfigures its policy 344) by taking actions and analyzing the rewards. A reward function can include, for example, R ($s_t$), R ($s_t$, $a_t$), and R ($s_t$, $a_t$, $s_{t+1}$). In some configurations, the reward function may be a user recommendation goodness function. For example, a reward function based on a user recommendation goodness function may include various quadratic terms representing considerations determined by a trained professional. That is, recommendations and other considerations used by a trained professional may be modeled into a user recommendation goodness function.

Each iteration (or after multiple iterations and/or steps) the agent 302 selects a policy 344 (and an action) based on a current state $s_t$, the epsilon value, and the agent 302 (or the machine learning model 332) calculates a reward. Each iteration, the agent 302 (or machine learning model 332) iteratively increases a summation of rewards. One goal of reinforcement learning is to determine a policy 344 that maximizes (or minimizes) the cumulative set of rewards, determined via the reward function.

The image capture application 125, for instance, weighs policy 344 based on the rewards determined at each step (or series of steps) such that certain policy 344 (and actions) are encouraged and/or discouraged in response to the environment 304 being in a certain state. The policy 344 is optimized by taking the gradient of an objective function (e.g., a reward function) to maximize a cumulative sum of rewards at each step, or after a predetermined number of steps (e.g., a delayed reward).

In some embodiments, the image capture application 125 may inject parameter noise into the agent-based feedback selection model 300. Parameter noise may result in greater exploration and more successful agent-based feedback selection model 300 by adding noise to the parameters of the policy selection.

In some embodiments, the rewards at each step may be compared (e.g., on an iterative basis) to a baseline. The baseline may be an expected performance (e.g., an expected user recommendation type), or an average performance (e.g., an average user recommendation type based on responses of several trained professionals). For example, historic user recommendations may be associated with images received by the image capture application 125. Evaluating a difference between the baseline and the reward is considered evaluating a value of advantage (or advantage value). The value of the advantage indicates how much better the reward is from the baseline (e.g., instead of an indication of which actions were rewarded and which actions were penalized).

In an example of training using agent-based feedback selection model 300, various trained professionals may determine feedback that they would provide to a user associated with various training images. The user feedback determined by the trained professionals may be used as the baseline by the agents 302. The agents 302 may compare the selected user feedback determined using the agents 302 and the policy to the baseline user feedback to evaluate whether the action selected by the agents 302 should be punished or rewarded. In some implementations, the baseline user feedback may be assigned a score (e.g., +1), and other user feedback types may be assigned a score (e.g., using a softmax classifier). The degree of the reward/punishment may be determined based on the difference of the baseline user feedback score and the selected user feedback score.

The image capture application 125 may iteratively train the policy until the policy satisfies an accuracy threshold based on maximizing the reward. For example, the agents 302 train themselves by choosing action(s) based on policies 344 that provide the highest cumulative set of rewards. The agents 302 of the machine learning model (e.g., the agent-based feedback selection model 300 executing in the feedback selection circuit 105) may continue training until a predetermined threshold has been satisfied. For instance, the agents 302 may train the machine learning model until a predetermined number of steps (or series of steps called episodes, or iterations) have been reached. Additionally, or alternatively, the agents 302 may train the machine learning model until the reward function satisfies a threshold value and/or the advantage value is within a predetermined accuracy threshold.

As shown, the image capture application 125 trains the machine learning model (e.g., the agent-based feedback selection model 300 executing in the feedback selection circuit 105) using, for example, asynchronous advantage actor critic reinforcement learning. In other embodiments, the image capture application 125 trains the agent-based feedback selection model 300 using other reinforcement learning techniques.

The image capture application 125 utilizes various asynchronous agents 302a to 302m associated with a corresponding environment to tune a policy 344. The image capture application 125 may employ a GPU to instantiate multiple learning agents 302 in parallel. Each agent 302 asynchronously performs actions and calculates rewards using a global model (such as a deep neural network). In some embodiments, the policy 344 may be updated every step (or predetermined number of steps) based on the cumulative rewards determined by each agent 302. Each agent 302 may contribute to the policy 344 such that the total knowledge of the model 332 increases and the policy 344 learns how to select user feedback based on an image ingested by the image capture application 125. Each time the model 332 is updated (e.g., after every step and/or predetermined number of steps), the image capture application 125 propagates new weights back to the agents 302 such that each agent shares a common policy 344.

Additionally or alternatively, the feedback selection circuit 105 may employ one or more lookup tables to select a user feedback response (or a type of user feedback). Lookup tables may be stored in memory 119, for example. In some implementations, one or more results of the image quality circuit 133 and/or the protocol satisfaction circuit 106 may map to a user feedback response. For instance, if the image quality circuit 133 determines that the image quality score satisfies a threshold (or satisfies a range), then a user feedback response (or type of user feedback) may be selected using the lookup table.

In an example, a BRISQUE machine learning model employed in the image quality circuit 133 may determine that the image quality in the inside of the user's 120 mouth is 80 (indicating a low quality image). Accordingly, the feedback selection circuit 105 may map the image quality score (and/or the location of the image quality score, such as the inside of the user's 120 mouth) to select user feedback (e.g., using the user feedback script) associated with a type of user feedback (e.g., "add more light"). That is, an image quality score of 80 inside the user's mouth may map to the type of user feedback "add more light." In a different example, an image quality score of 30 inside the user's mouth (indicating a good high quality image) may map to the type of user feedback "add a little more light."

In some embodiments, hardware may be used in conjunction with the image capture application 125. For example, object detection circuit may detect objects in video feed and/or detect objects in captured images. The image capture application 125 may determine, based on the detected object, to provide feedback to the user 120 using the detected hardware. For example, a user 120 in possession of a stretching hardware may receive feedback from the image capture application 125 on how to better position the stretching hardware (e.g., place lips around the hardware, insert the hardware further into the user's mouth, stick out the user's tongue with the hardware in the mouth).

In some implementations, the image capture application 125 may recommend that the user use hardware to improve the quality of the image. For example, the image capture application 125 may recommend common household hardware (e.g., spoons, flashlights) to manipulate the environment of the image and/or the user's mouth. Additionally or alternatively, the image capture application 125 may recommend more sophisticated hardware (e.g., a stretcher, such as a dental appliance configured to hold open the user's upper and lower lips simultaneously to permit visualization of the user's teeth and further configured to continue holding open the user's upper and lower lips in a hands-free manner after being positioned at least partially within the user's mouth where the dental appliance includes a handle having two ends and a pair of flanges at each end of the handle). Additionally or alternatively, the image capture application 125 may prompt the user for information related to available hardware. For example, the image capture application 125 may ask the user 120 whether the user 120 has access to hardware (e.g., spoons, stretchers, flashlights, etc.). The user 120 may respond orally such that a microphone of the user device 121 captures the user's response and/or the user 120 may respond using the screen of the user device 121 (e.g., interacting with a button on a GUI, entering text into a text field).

In some implementations, the image capture application 125 may be configured to capture several images for a particular downstream application. For example, an application of the server 110 may effectively generate a 3D model (or other parametric model) of a user's detention given multiple angles of a user's mouth. Accordingly, the image capture application 125 may be configured to capture three high quality images of the user's mouth. In an example, the image capture application 125 may guide the user 120 to capture a high quality image of the user's mouth at a front-facing angle. However, the user 120 may capture an image of the user's mouth at a side angle.

In some implementations, the image capture application 125 may determine that the image of the user's mouth at the side angle is not the image of the user's mouth at the front-facing angle. The image capture application 125 may invoke the feedback selection circuit 105 to select feedback to guide the user 120 to the desired high quality image (e.g., the image at the particular side angle). In other implementations, the image capture application 125 may determine that the image of the user's mouth at the side angle, while not the image of the user's mouth at the front-facing angle, is still a high quality image of the user's mouth at the side angle. That is, the image of the user's mouth at the side angle may be a high quality image with respect to the image characteristics (e.g., lighting, blur) and with respect to the image content.

If the image capture application 125 was configured to retrieve three high quality images of the user's mouth (one at a front-facing angle, one at a side angle, and one at a top-down angle) then the image capture application may determine that the high quality image of the image of the user's mouth at the side angle has already been captured and store the image in memory 119. That is, even though the image capture application 125 was guiding the user 120 to capture an image of the user's mouth at the front angle, the image capture application 125 will recognize that a high quality image of the user's mouth at a side angle was captured. Subsequently, the image capture application 125 may proceed guiding the user 120 to capture a high quality image of the user's mouth at a front angle.

Figure 5:
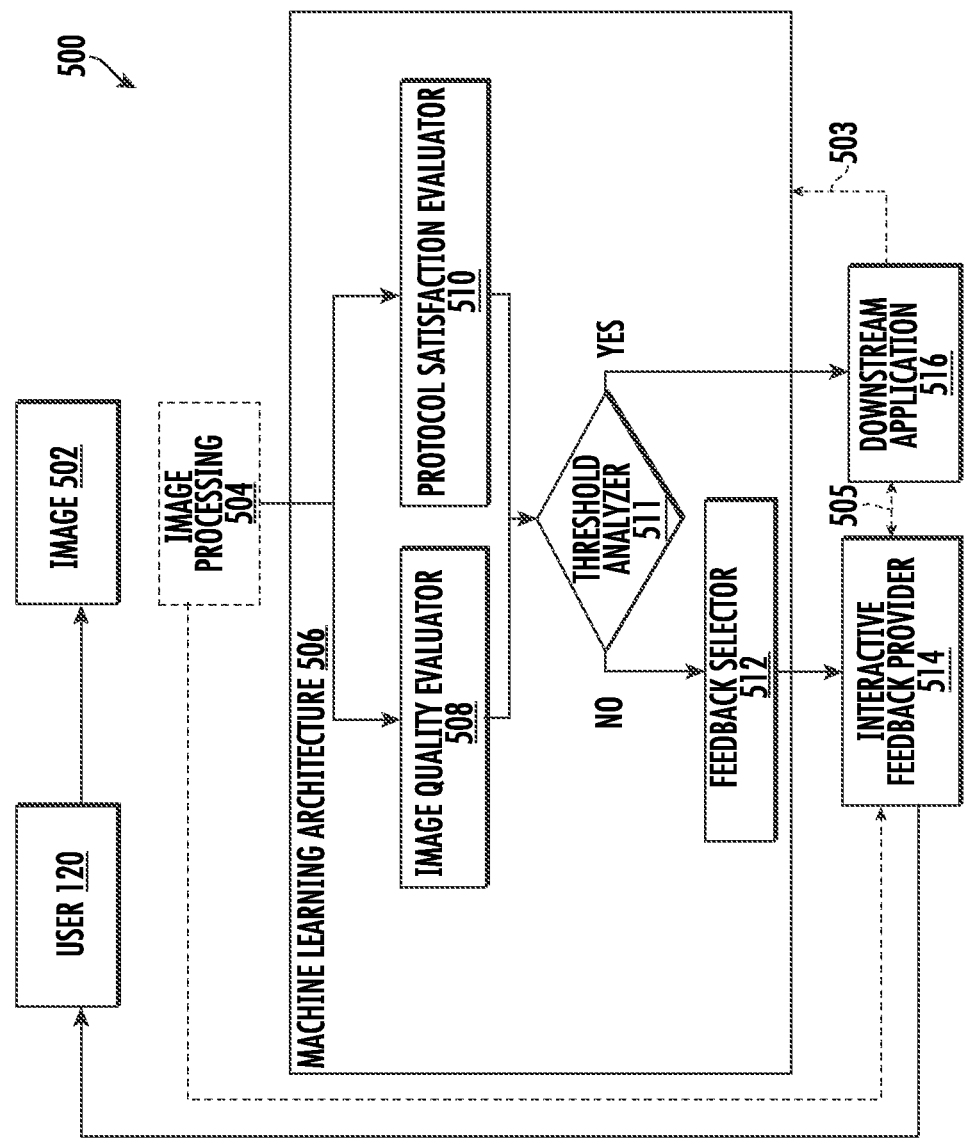
FIG. 5 is an interactive communication flow utilizing the image capture application, according to an illustrative embodiment.

FIG. 5 is an interactive communication flow utilizing the image capture application 125, according to an illustrative embodiment. The image capture application 125 may ingest an image 502 received from the user device 121. For example, the user 120 may initialize the image capture application and capture a baseline image 502. Additionally or alternatively, the image 502 may be a video (e.g., a continuous stream of data).

In some implementations, the image capture application 125 may perform one or more preprocessing operations 504 on image 502. For example, preprocessing operations 504 may include determining whether the image 502 contains a mouth. That is, the image capture application 125 may employ object detection algorithms trained to identify various facial features. For instance, the object detection algorithm may be trained to identify teeth, lips, tongue, nose, a chin, ears, and the like. In some embodiments, the user 120 may capture an image 502 not including a portion of the user's mouth (e.g., the captured image may include the user's ears). Accordingly, the image capture application 125 may execute interactive feedback 514 (employing the feedback selection circuit 105) to select feedback (e.g., using agents 302 in the agent-based feedback selection model 300) indicating that the user 120 should capture a new image and include a portion of the user's 120 mouth.

Additionally or alternatively, preprocessing operations 504 may include parsing a video signal into video frames. The frames may be portions or segments of the video signal across the time series. For example, at time t=0, the image capture application 125 may capture a static snapshot of the video data, at time t=2, the image capture application 125 may capture a static snapshot of the video data. The time between frames may be pre-established or dynamically determined. The time between frames may be static (e.g., frames are captured every 2 seconds) or variable (e.g., a frame is captured 1 second after the previous frame, a next frame is captured 3 seconds after the previous frame, and the like). In other embodiments, preprocessing operations 504 include normalizing the image 502, scaling the image, and/or converting the image into a greyscale image, among others.

In some implementations, preprocessing operations 504 may include extracting features of the image 502. The image capture application 125 may perform feature extraction by applying convolution to the image 502 and generating a feature map of extracted features. Convolving the image 502 with a filter (e.g., kernel) has the effect of reducing the dimensionality of the image 502.

Additionally or alternatively, the preprocessing operations 504 may include performing pooling operations on the extracted feature map. For example, applying a max pooling layer on the feature map detects the prominent features of the feature map. Additionally or alternatively, applying an average pooling operation averages the features of the feature map. Applying a pooling operation on the feature map has the effect of further down sampling the feature map. In some configurations, the preprocessing operation 504 may include a flattening operation, in which the image capture application 125 arranges a feature map (represented as an array) into a one-dimensional vector.

In some implementations preprocessing operations 504 may include performing image segmentation (e.g., grouping pixels together with similar attributes, delineating objects in an image). For instance, particular teeth may be segmented using masks and/or edge detection algorithms such that the image capture application 125 may be used to evaluate the image quality of a particular tooth. For example, the machine learning architecture 506 may evaluate the image characteristics of the portion of the image containing the tooth and/or the tooth content of the image (e.g., whether the visibility of the tooth satisfies a threshold).

In some implementations, preprocessing operations 504 include performing pose estimation on the image 502. The image capture application may perform pose estimation using, for instance, bottom-up pose estimation approaches and/or top-down pose-estimation approaches. For example, preprocessing operations 504 may implement an encoder-decoder architecture to estimate landmarks on an image.

Referring to FIG. 6, illustrated are a series of images 600-602 and corresponding landmark models 610-612, according to an illustrative embodiment. As shown, pose estimation may be performed to identify localized human landmarks using landmark models (or sets of landmarks) in an image or video frame. The landmark model 610 corresponding to image 600, and landmark models 612 corresponding to image 602 indicate coordinates, angles, and features relevant to head angles, mouth angles, jaw angles, and/or visibility of teeth in the image. For example, in landmark model 610, landmark 616 may identify a mouth landmark, landmark 618 may identify a face landmark, and landmark 614 may identify teeth landmarks. In landmark model 612, landmarks 620 may identify teeth landmarks, landmark 622 may identify mouth landmarks, and landmark 624 and 626 may identify face landmarks. In some embodiments, the pose estimation algorithms may be configured to identify landmarks to a high resolution by identifying and distinguishing face landmarks. For example, landmark 626 may identify a chin landmark instead of simply a face landmark. In some configurations, the image capture application 125 may display the marked images to a user 120.

Figure 7:
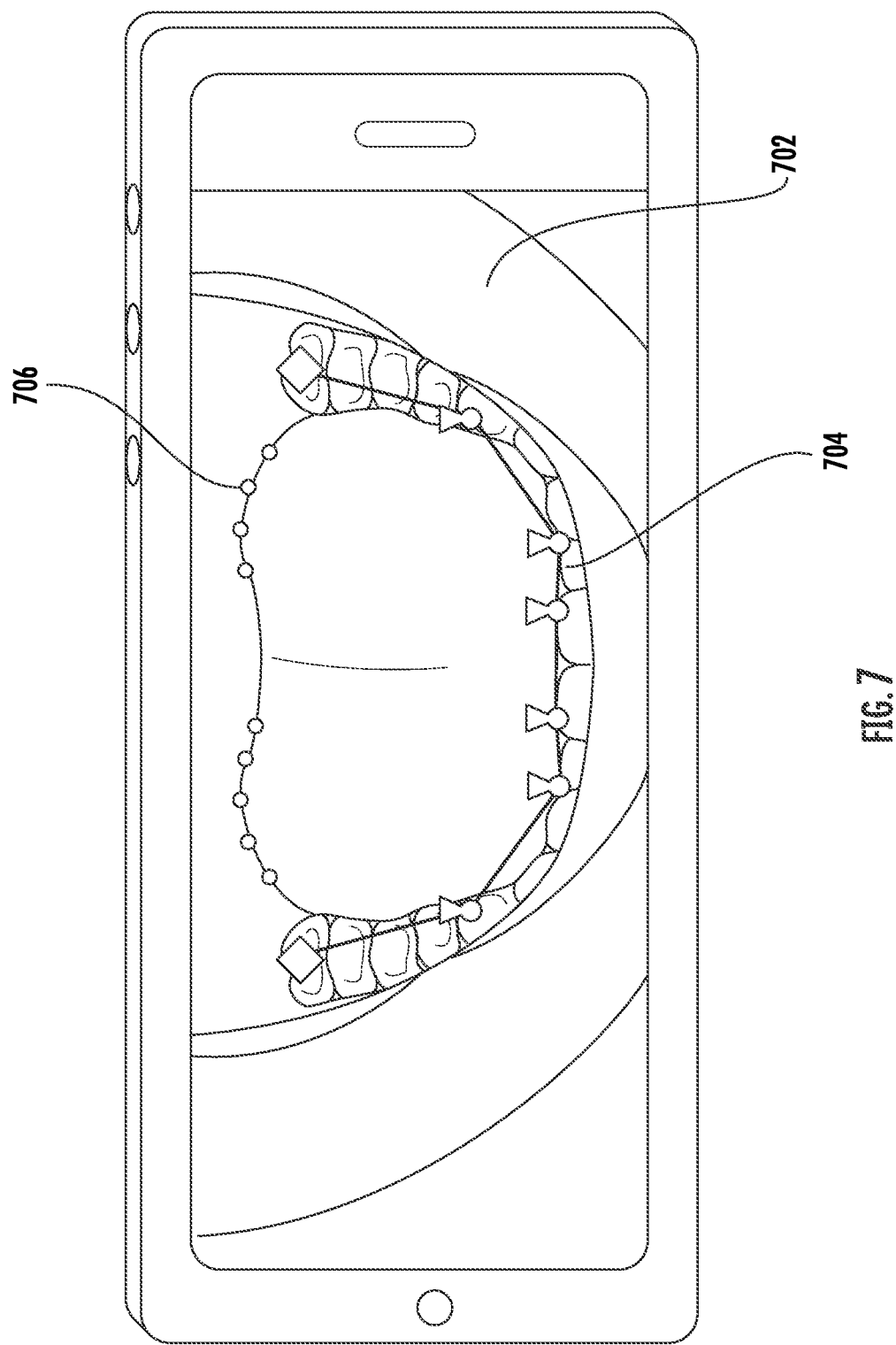
FIG. 7 is a landmarked model of a user, according to an illustrative embodiment.

Referring to FIG. 7, illustrated is a landmark model 702 of a user 120, according to an illustrative embodiment. As shown, the user 120 may observe from the landmark model 702 that the image is a high quality image based on the characteristics of the image (e.g., the brightness, sharpness, contrast) and the content of the image (e.g., teeth are identified/adequately distinguished using landmarks 704).

In the example, the teeth landmarks 704 are adequately distinguished because at a prior point in time, the user capture application 125 communicated user feedback instructing the user 120 to move their tongue. The image capture application 125 may have provided that feedback to the user 120 by determining that the prior tongue landmark associated with a prior image was incorrect (e.g., the tongue landmark indicated that the tongue was covering an area of the mouth that should be identified by one or more teeth landmarks, the user's tongue was covering the user's teeth).

In some implementations, the image capture application 125 may determine that various landmarks are incorrect (e.g., in a suboptimal position) by comparing average landmark models associated with high quality images to landmark models identified in a captured image. The average landmark models may be average landmark models of all users, average landmark models of similar users (e.g., similar users based on a demographic, users of the same age, users of the same gender, users of the same race), or the like. In other implementations, the image capture application 125 may compare a specific user landmark model (e.g., determined using a high quality image captured at a previous point in time such as with certain hardware and/or with assistance from trained professionals) to landmark models identified in a captured image to determine landmarks that should be identified such that a type of user feedback may be selected.

Referring back to FIG. 5, in some implementations, the machine learning architecture 506 may include several machine learning models. For example, as shown, the machine learning architecture 506 includes the image quality evaluator 508, the protocol satisfaction evaluator 510, and the feedback selector 512. In other implementations, the machine learning architecture 506 may be a single machine learning model.

In an example implementation, the machine learning architecture 506 may be a reinforcement learning model such as an agent-based feedback selection model 300. For example, the input to the machine learning architecture 506 (e.g., the reinforcement learning model) may be the image 502, and the output of the machine learning architecture 506 may be user feedback and/or types of user feedback (as described herein, with reference to FIG. 3).

Figure 8:
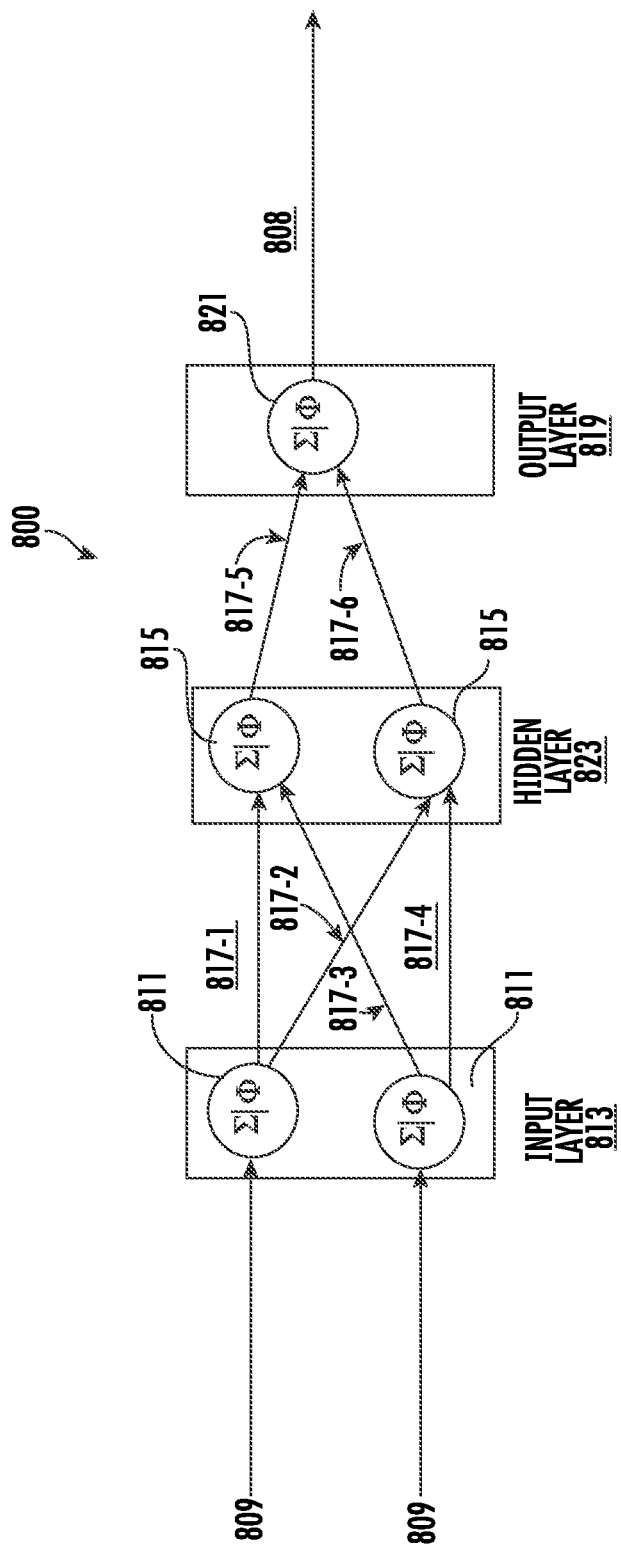
FIG. 8 is a block diagram of a simplified neural network model, according to an illustrative example.

Additionally or alternatively, the machine learning architecture 506 may be a neural network. FIG. 8 is a block diagram of a simplified neural network model 800, according to an illustrative example. The neural network model 800 may include a stack of distinct layers (vertically oriented) that transforms a variable number of inputs 809 (e.g., image 502) being ingested by an input layer 813 into an output 808 at the output layer 819 via one or more hidden layers 823 between the input layer 813 and the output layer 819.

The input layer 813 includes neurons 811 (or nodes) connecting to each of the neurons 815 in the hidden layer 823. The neurons 815 in the hidden layer 823 connect to neuron 821 in the output layer 819. The output layer 819 determines output user feedback (or type of user feedback) 808 using, for example, a softmax classifier. The output layer 819 may use a softmax function (or a normalized exponential function) to transform an input of real numbers into a normalized probability distribution over predicted output classes. For example, output classes may include various user feedback types. The neural network model 800 may learn to determine whether the image is a high quality image and classify/predict a type of user feedback (as described with reference to FIG. 3) in response to the quality of the image. In some embodiments, the user feedback predicted by the neural network model 800 may be to do nothing. That is, the image may be a high quality image.

Generally, neurons (811, 815, 821) perform particular computations and are interconnected to nodes of adjacent layers. Each of the neurons 811, 815 and 821 sum the values from the adjacent nodes and apply an activation function, allowing the neural network 800 to learn to predict user feedback.

Each of the neurons 811, 815 and 821 are interconnected by algorithmic weights 817-1, 817-2, 817-3, 817-4, 817-5, 817-6 (collectively referred to as weights 817). Weights 817 are tuned during training to adjust the strength of the neurons. For example, the adjustment of the strength of the neuron facilitates the neural network's 800 ability to learn non-linear relationships between the input image and a predicted output 808 user feedback. The neural network model 800 optimizes the algorithmic weights during training such that the neural network model 800 learns to make (select, generate, or provide) user feedback predictions/recommendations that mirror those recommendations of a trained professional.

Figure 9:
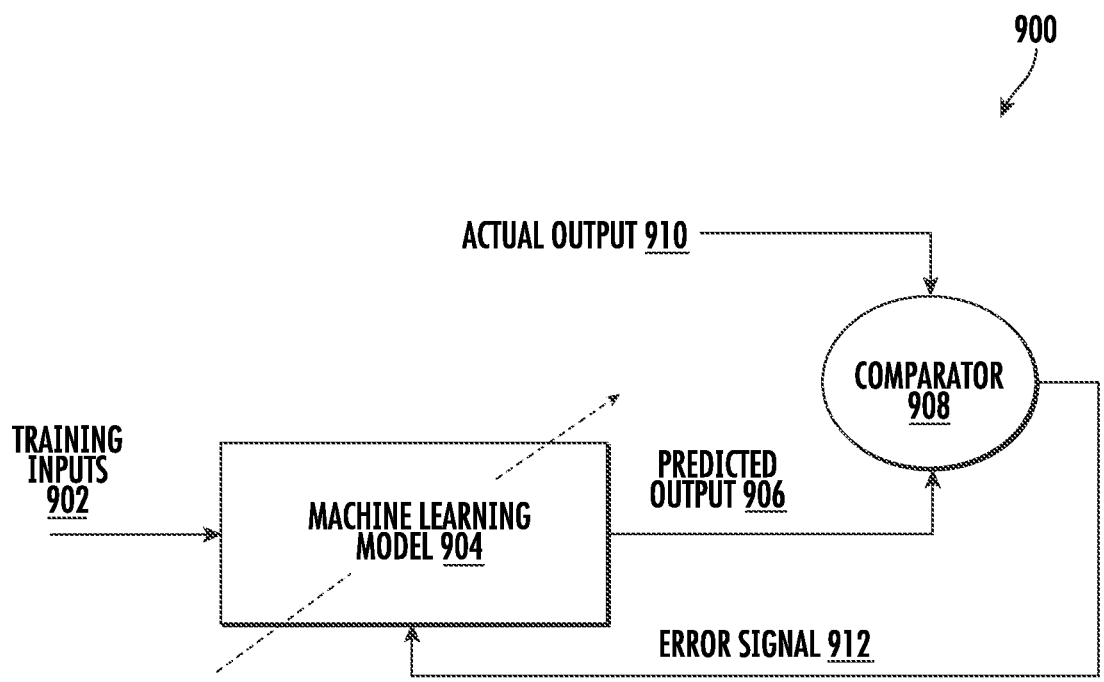
FIG. 9 is a block diagram of an example system using supervised learning, according to an illustrative embodiment.

FIG. 9 is a block diagram of an example system 900 using supervised learning, according to an illustrative embodiment. Supervised learning is a method of training a machine learning model (e.g., neural network model 800 described in FIG. 8). Supervised learning trains a machine learning model using an input-output pair. An input-output pair is an input with an associated known output (e.g., an expected output).

Machine learning model 904 may be trained on known input-output pairs such that the machine learning model 904 can learn how to predict known outputs given known inputs. Once a machine learning model 904 has learned how to predict known input-output pairs, the machine learning model 904 can operate on unknown inputs to predict an output.

Training inputs 902 and actual outputs 910 may be provided to the machine learning model 904. Training inputs 902 may include historic user inputs (e.g., images captured by the image capture application, image captured by a trained professional). Actual outputs 910 may include actual user feedback and/or types of user feedback. Actual user feedback may be feedback determined by one or more trained professionals in response to evaluating the corresponding image (e.g., the corresponding training input 902). The inputs 902 and actual outputs 910 may be received from the server 110. For example, memory 119B of the server 110 may store input-output pairs (e.g., images and corresponding actual user feedback).

In an example, a machine learning model 904 may use the training inputs 902 (e.g., images) to predict outputs 906 (e.g., a predicted user feedback), by applying the current state of the machine learning model 904 to the training inputs 902. The comparator 908 may compare the predicted outputs 906 to the actual outputs 910 (e.g., actual user feedback) to determine an amount of error or differences.

The error (represented by error signal 912) determined by the comparator 908 may be used to adjust the weights in the machine learning model 904 such that the machine learning model 904 changes (or learns) over time. The machine learning model 904 may be trained using a backpropagation algorithm, for instance. The backpropagation algorithm operates by propagating the error signal 912. The error signal 912 may be calculated each iteration (e.g., each pair of training inputs 902 and associated actual outputs 910), batch, and/or epoch and propagated through all of the algorithmic weights in the machine learning model 904 such that the algorithmic weights adapt based on the amount of error. The error is minimized using a loss function. Non-limiting examples of loss functions may include the square error function, the room mean square error function, and/or the cross entropy error function.

The weighting coefficients of the machine learning model 904 may be tuned to reduce the amount of error thereby minimizing the differences between (or otherwise converging) the predicted output 906 and the actual output 910. The machine learning model 904 may be trained until the error determined at the comparator 908 is within a certain threshold (or a threshold number of batches, epochs, or iterations have been reached). The trained machine learning model 904 and associated weighting coefficients may subsequently be stored in memory 119B or other data repository (e.g., a database) such that the machine learning model 904 may be employed on unknown data (e.g., not training inputs 902). Once trained and validated, the machine learning model 904 may be employed during testing (or an inference phase). During testing, the machine learning model 904 may ingest unknown data to predict user feedback.

Referring back to FIG. 5, in some implementations, the machine learning architecture 506 may be trained (e.g., as a single model or as multiple model) using average training data. That is, image data (e.g., mouth data) associated with multiple users. Additionally or alternatively, the machine learning architecture 506 may be trained using particular training data. For example, the machine learning architecture 506 may be trained according to a single user, regional/geographic users, particular user genders, user's grouped with similar disabilities, users of certain ages, and the like. Accordingly, the machine learning architecture may be user-specific.

The image quality evaluator 508 may evaluate the quality of the image 502 with respect to image characteristics using the results of the image quality circuit 133. The protocol satisfaction evaluator may evaluate the quality of the image 502 with respect to the image content using the results of the protocol satisfaction circuit 106.

For example, the protocol satisfaction circuit 106 may determine a size of the user's 120 tooth based on a captured image 502. The protocol satisfaction evaluator 510 may determine, based on the size of the tooth in the image 502 determined from the protocol satisfaction circuit 106, whether the size of the tooth in the image satisfies a tooth size threshold (e.g., an image quality content threshold).

In some implementations, various image quality content thresholds may exist for various purposes. For example, a first image quality content threshold regarding the size of a tooth may exist if a downstream application involves diagnosing the user 120. Additionally or alternatively, a second image quality content threshold regarding the size of the tooth may exist if a downstream application involves generating a parametric model of the user's tooth. That is, different downstream applications may have different thresholds of the content of a high quality image. Accordingly, the protocol satisfaction evaluator 510 may apply various image quality content thresholds to the results of the protocol satisfaction circuit 106. Similarly, the image quality evaluator may apply various image characteristic content thresholds to the results of the image quality circuit 133.

The threshold analyzer 511 may evaluate the outputs of both the protocol satisfaction evaluator 510 and the image quality evaluator 508. In some configurations, if both the protocol satisfaction evaluator 510 and the image quality evaluator 508 determine that the image is a high quality image (e.g., with respect to the image content and the characteristics of the image respectively), then the downstream application 516 will receive the image 502 (or the preprocessed image resulting from the image preprocessing operations 504).

In other configurations, no predetermined amount of images or data may be specified. For example, the downstream application 516 may receive image 502 data (or the preprocessed image resulting from the image preprocessing operations 504), and/or data resulting from the machine learning architecture (e.g., image characteristics determined from the image quality circuit 133 from the image quality evaluator 508, results from the image quality evaluator 508, image content determined from the protocol satisfaction circuit 104 from the protocol satisfaction evaluator 510, results from the protocol satisfaction evaluator 510, and the like). That is, one or more results from the machine learning models of the machine learning architecture 506 and/or results from the machine learning architecture 506 may be provided to the downstream application 516. The downstream application 516 may request data from the machine learning architecture 506 until the machine learning architecture 506 receives, for instance, a trigger (or other notification/command, indicated by communication 503) from the downstream application 516.

The downstream application 516 may also receive feedback from the interactive feedback provider 514 (based on the results of the feedback selection circuit 105) indicated by communication 505. The downstream applications 516 may also provide information associated with the image quality (including information associated with the image characteristics and/or information associated with the image content) to the interactive feedback provider 514 indicated by communication 505. Accordingly, the interactive feedback provider 514 (and specifically the feedback selection circuit 105) may determine feedback in response to the data communicated by the downstream application 516. For example, the downstream application 516 may complete one or more objectives of the downstream application 516 (e.g., generate a 3D model (or other parametric model) of the user's teeth from a high quality 2D image of the user's teeth). In response to the downstream application 516 completing the one or more objectives, the interactive feedback provider 514 may communicate to the user 120 feedback (determined using the data of the downstream application) such as "Capture Successful!", "Great Job!", "Stop Capturing", or "Finished!" (or other phrases of the dictionary of phrases from the user feedback script).

In an illustrative example, the image capture application 125A of the user device 121 may transmit the image 502 (or portion of the image identified as a high quality portion of the image) to the image capture application 125B of the server 110. In other embodiments, before the image capture application 125A of the user device 121 transmits the image 502 to the image capture application 125B of the server, the image capture application 125A may determine whether the image 502 satisfies one or more additional criteria (e.g., in addition to determining that the image 502 is a high quality image). For example, the image capture application 125 may perform pose estimation on the image 502 and determine whether the landmarks identified using pose estimation are suitable for the image capture application 125B of the server 110 or other downstream applications at the server 110.

In some embodiments, the machine learning architecture 506 (or the image quality evaluator 508 and/or the protocol satisfaction evaluator 510) may be used to predict an image quality (including image characteristics and/or image content) of a future image (or multiple future images/portions of images) using a historic image (or multiple historic images/portions of images). The future image may be an image that has not been captured by the image capture application 125 yet. In these embodiments, the image capture application 125 may anticipate a movement of the user 120 using the predicted result(s) of the machine learning architecture 506 (or the image quality evaluator 508 and/or the protocol satisfaction evaluator 510). The anticipated movement of the user 120 may be fed to a downstream application.

In other embodiments, other methods may be used to estimate image quality (including image characteristics and/or image content) using historic images. For example, the machine learning architecture 506 may include a different machine learning model such as a convolutional neural network, such as a Mesh R-CNN, specifically trained to predict an image content quality and/or an image characteristic quality (or a combination of an image content quality and/or image characteristic quality) using image qualities and/or image content determined from historic images (e.g., by the machine learning architecture 506, the image quality evaluator 508 and/or the protocol satisfaction evaluator 510).

In an illustrative example, if a user 120 moves the user device 121 towards a light, a next image (e.g., a future image) may be brighter than the previous image. The image capture application may detect the trend toward brighter lighting and may anticipate that future image(s), which have not been captured yet, will be brighter than the currently captured image (or other historic images).

Downstream applications may include applications that incorporate control systems (e.g., using a proportional integral derivative (PID)) controllers. A PID controller may be a controller that uses a closed loop feedback mechanism to control variables relating to the image capture process. For example, the PID controller may be used to control an input/output circuit 128 (e.g., a generate instructions to move or autofocus a camera at the user device 121).

Downstream applications of the server 110, such as downstream application 516 in FIG. 5, (or a downstream application executing on one or more other servers) may be configured to generate three-dimensional (3D) models/reconstructions of the image (or high quality portions of the image). Generating 3D models from 2D images is described in more detail in U.S. patent application Ser. No. 16/696,468, now U.S. Pat. No. 10,916,053, titled "SYSTEMS AND METHODS FOR CONSTRUCTING A THREE-DIMENSIONAL MODEL FROM TWO-DIMENSIONAL IMAGES" filed on Nov. 26, 2019, and U.S. patent application Ser. No. 17/247,055 titled "SYSTEMS AND METHOD FOR CONSTRUCTING A THREE-DIMENSIONAL MODEL FROM TWO DIMENSIONAL IMAGES" filed on Nov. 25, 2020, where the contents of these applications are incorporated herein by reference in their entirety. Downstream applications of the server 110 may also be configured to generate parametric models of the image (or high quality portions of the image).

In some embodiments, the downstream application of the server generates a treatment plan (e.g., a series of steps used to correct or otherwise modify the positions of the user's teeth from an initial position to a final position or other intermediary positions) using the portions of images that are determined to be high quality portions. The downstream application 516 may determine a parametric model generated from the portions of the images that are determined to be high quality. For example, the downstream application 516 generating the treatment plan may enable manipulation of individual teeth parametric model(s) determined using one or more portions of high quality images. The manipulations may be performed manually (e.g., based on a user input received via the downstream application 516), automatically (e.g., by snapping/moving the teeth parametric model(s) to a default dental arch), or some combination. In some embodiments, the manipulation of the parametric model(s) may show a final (or target) position of the teeth of the patient (e.g., user 120) following treatment via dental aligners. The downstream application may be configured to automatically generate a treatment plan based on the initial position (e.g., as reflected in the model corresponding to the portions of the captured high quality image) and the final position (e.g., following manipulation of the parametric model(s) and any optional adjustments).

Downstream applications of the server 110 (or other server) may also be configured to manufacture an aligner or other piece of hardware (e.g., a retainer). The downstream application may use a treatment plan, or one or more steps of the treatment plan (e.g., generated from a parametric model as described herein or otherwise received as an input) to fabricate an aligner. In some embodiments, before the aligner is fabricated, the treatment plan may be approved by a remote dentist/orthodontist. For example, a 3D printing system (or other casting equipment) may cast, etch, or otherwise generate physical models based on the parametric models of one or more stages of the treatment plan. A thermoforming system may thermoform a polymeric material to the physical models, and cut, trim or otherwise remove excess polymeric material from the physical models to fabricate dental aligners (or retainers). The dental aligners or retainers can be fabricated using any of the systems or processes described in U.S. patent application Ser. No. 16/047,694, titled "Dental Impression Kit and Methods Therefor," filed Jul. 27, 2018, and U.S. patent application Ser. No. 16/188,570, now U.S. Pat. No. 10,315,353, titled "Systems and Methods for Thermoforming Dental Aligners," filed Nov. 13, 2018, the contents of each of which are hereby incorporated by reference in their entirety. The retainer may function in a manner similar to the dental aligners but to maintain (rather than move) a position of the patient's teeth. In some embodiments, the user 120 may be triggered (e.g., by a notification) to execute the image capture application such that high quality images (or portions of images) may be captured by the user 120 after the user's teeth have reached a final position.

Downstream applications of the server 110 (or other server) may also be configured to monitor a dental condition of the user 120. The downstream application may be configured to trigger the image capture application 125 to prompt the user 120 to capture high quality images (or portions of images) of the user's teeth at intervals (e.g., annual checks, monthly checks, weekly checks). The downstream application may scan the high quality image for dental conditions such as cavities and/or gingivitis. For example, the downstream application may use machine learning models or object detection models to determine whether the high quality of one or more teeth is affected by a dental condition. The downstream application may also determine the degree of the dental condition (e.g., a quantitative or qualitative indication of the degree of gingivitis, for instance).

Downstream applications may also monitor a position of one or more teeth of the user 120 by comparing an expected teeth position (e.g., a final position of the treatment plan or other intermediate position of the treatment plan) to a current position of one or more teeth. The downstream application may monitor the user's teeth to determine whether the user's treatment is progressing as expected. The downstream application may be configured to trigger the image capture application 125 to prompt the user 120 to capture high quality images (or portions of images) of the user's teeth to determine a current position of the user's teeth (e.g., using a current high quality image of the users teeth to generate a current parametric model of the user's teeth).

In some embodiments, downstream applications executed on the server 110 may be applications that may be performed offline or may be associated with high latency (e.g., the user 120 may wait several minutes, hours, days, or weeks before receiving results from the downstream application).

If either the protocol satisfaction evaluator 510 or the image quality evaluator 508 determine that the image is not a high quality image, then the interactive feedback provider 514 may provide feedback to the user 120 (e.g., based on the results of the feedback selection circuit 105). The interactive feedback provider 514 may provide a closed feedback loop to the user 120 such that a new image 502 is captured after the user 120 receives feedback (and responds to the feedback) from the interactive feedback provider 514. Each of the images 502 received by the machine learning architecture 506 are independent. The interactive feedback provider 514 is configured to provide unique feedback for each image, where each image is captured and analyzed independently of other images. Further, each image may contain a unique set of features.

In response to receiving feedback from the interactive feedback provider 514, the subsequent image 502 received by the machine learning architecture 506 may be improved (e.g., a higher quality image with respect to at least one of the image characteristics of the image or the image content).

Figure 10:
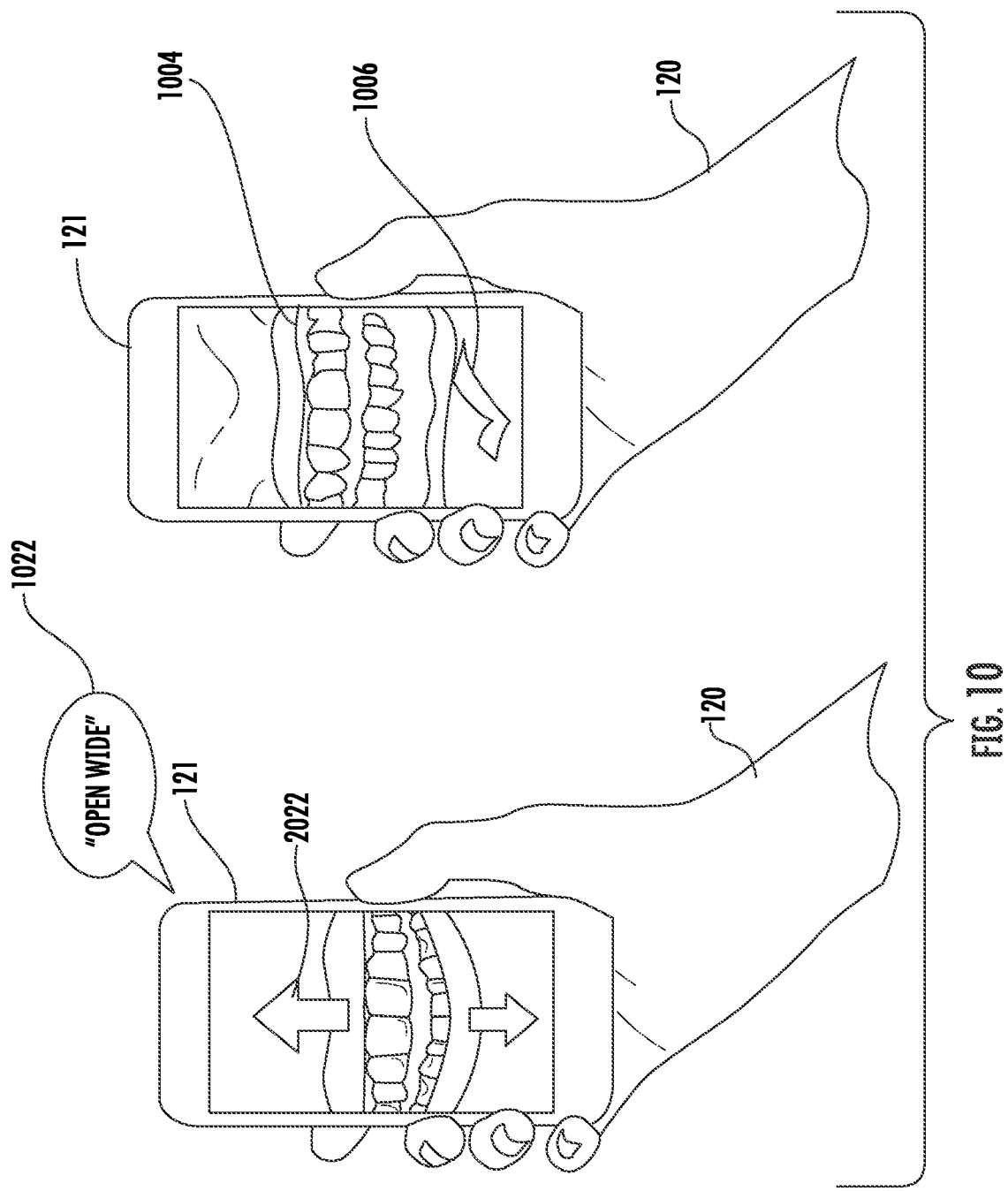
FIG. 10 is an illustration of interactive communication resulting from the implementation of the machine learning architecture of FIG. 5, according to an illustrative embodiment.

Referring to FIG. 10, illustrated is the interactive communication resulting from the implementation of the machine learning architecture of FIG. 5, according to an illustrative embodiment. The image capture application 125 may receive an image 502. The image capture application 125 ingests the image and applies the machine learning architecture 506. The quality of the image is evaluated by the image quality evaluator 508 (implemented using the image quality circuit 133) to determine whether the characteristics of the image 502 satisfies one or more thresholds. The image quality evaluator 508 determines that the image characteristics satisfy the image quality thresholds associated with the image characteristics. The quality of the image is also evaluated by the protocol satisfaction evaluator 510 (implemented using the protocol satisfaction circuit 106) to determine whether the image content satisfies one or more thresholds. The protocol satisfaction evaluator 510 determines that the image is not a high quality image based on the image quality score not satisfying an image quality threshold associated with the image content. Accordingly, feedback selector 512 (implemented using the feedback selection circuit 105) selects feedback to be communicated to the user via interactive feedback provider 514. As shown, feedback 1022 is both displayed and audibly announced to the user 120. Feedback 1022 may communicate to the user 120 to adjust the user's lips.

The image capture application 125 receives a subsequent image 502 from the user 120. The subsequent image is ingested by the image capture application 125 and applied to the machine learning architecture 506. The quality of the image is evaluated by the image quality evaluator 508 again (implemented using the image quality circuit 133) to determine whether the image still satisfies the image quality thresholds associated with the image characteristics. The quality of the image is also evaluated by the protocol satisfaction evaluator 510 again (implemented using the protocol satisfaction circuit 106) to determine whether the image content satisfies the image quality threshold associated with the image content. As shown, responsive to the feedback 1022, the user 120 moves their lips 1004 such that the second image 502 satisfies the image quality thresholds (e.g., both the image quality thresholds associated with the image characteristics and the image quality thresholds associated with the image content). Indicator 1006 communicates to the user 120 that the second image is more optimal than the first image.

Figure 11:
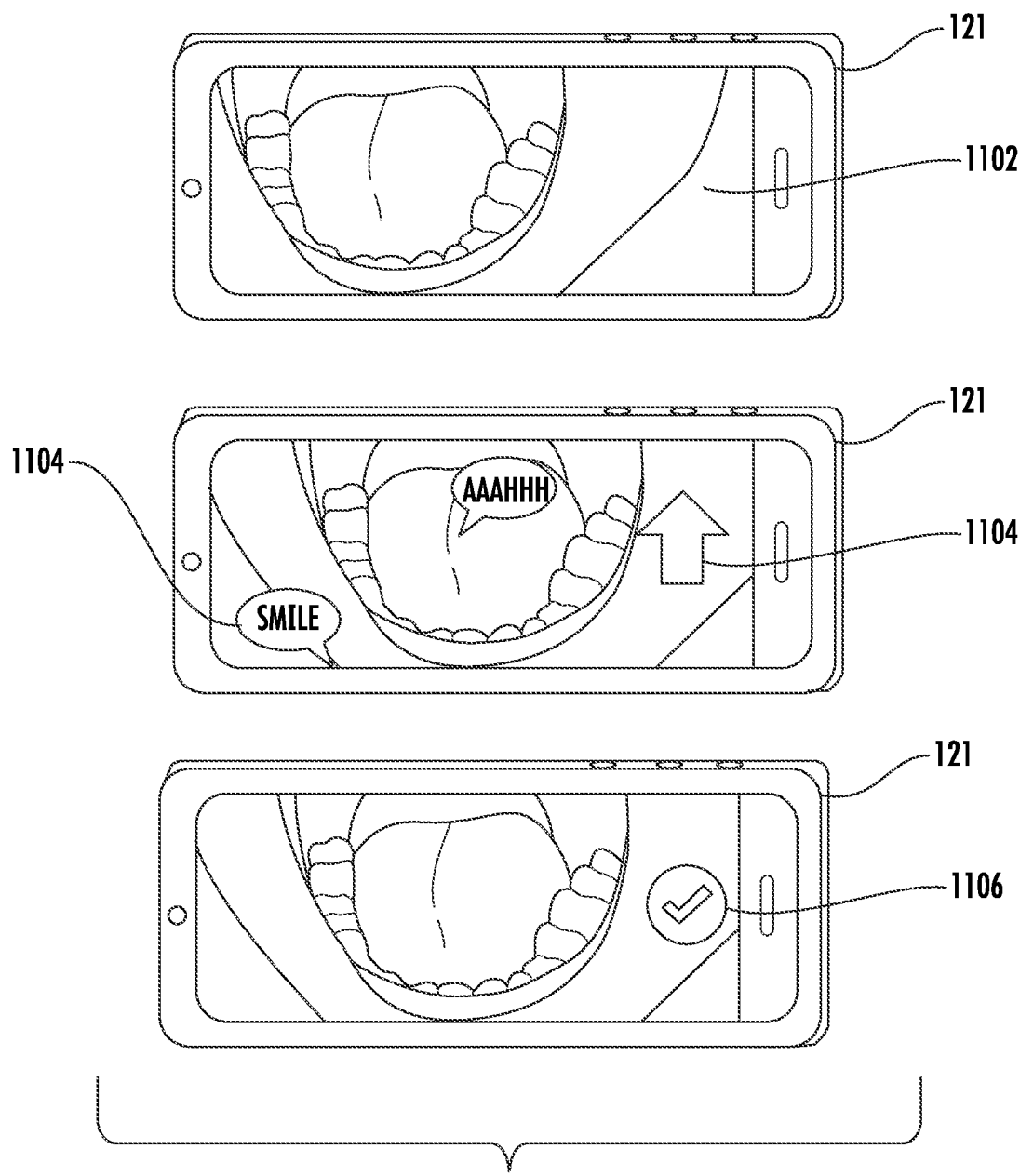
FIG. 11 is another illustration of interactive communication resulting from the implementation of the machine learning architecture of FIG. 5, according to an illustrative embodiment.

FIG. 11 illustrates the interactive communication resulting from the implementation of the machine learning architecture of FIG. 5, according to another illustrative embodiment. The image capture application 125 may receive an image 502 as shown in 1102. The image capture application 125 ingests the image and applies the machine learning architecture 506. The quality of the image is evaluated by the image quality evaluator 508 (implemented using the image quality circuit 133) to determine whether the image characteristics satisfy one or more thresholds. The image quality evaluator 508 determines that the image characteristics satisfy the image quality thresholds associated with the image characteristics. The quality of the image is also evaluated by the protocol satisfaction evaluator 510 (implemented using the protocol satisfaction circuit 106) to determine whether the image content satisfies one or more thresholds. The protocol satisfaction evaluator 510 determines that the image is not a high quality image based on the image quality score not satisfying an image quality threshold associated with the image content. Accordingly, feedback selector 512 (implemented using the feedback selection circuit 105) selects feedback to be communicated to the user via interactive feedback provider 514. As shown, feedback 1104 is both displayed and audibly announced to the user 120. Feedback 1104 may communicate to the user 120 to adjust the size, distance, angle, and/or orientation of the user device 121 relative to the user 120. Accordingly, the interactive feedback provider 514 is able to communicate multiple instructions to the user 120 in response to a single input image 502.

The image capture application 125 receives a continuous data stream (e.g., video data). The image capture application 125 parses the video data into frames and analyzes the frames of the video as if the frames were images. Frames are applied to the machine learning architecture 506. The quality of the frame is evaluated by the image quality evaluator 508 (implemented using the image quality circuit 133) to determine whether the image characteristics satisfy the image quality thresholds associated with the image characteristic. The quality of the frame is also evaluated by the protocol satisfaction evaluator 510 (implemented using the protocol satisfaction circuit 106) to determine whether the image content satisfies the image quality threshold associated with image content. As shown, responsive to the feedback 1104, and based on the continuous adjustments of the user device 121, the image capture application 125 may determine that a frame of the continuous data stream satisfies the image quality thresholds (e.g., both the image quality thresholds associated with the image characteristics and the image quality thresholds associated with the image content). Indicator 1106 communicates to the user 120 that a high quality image has been captured. In some implementations, the image capture application 125 displays the captured high quality image to the user 120.

Figure 12:
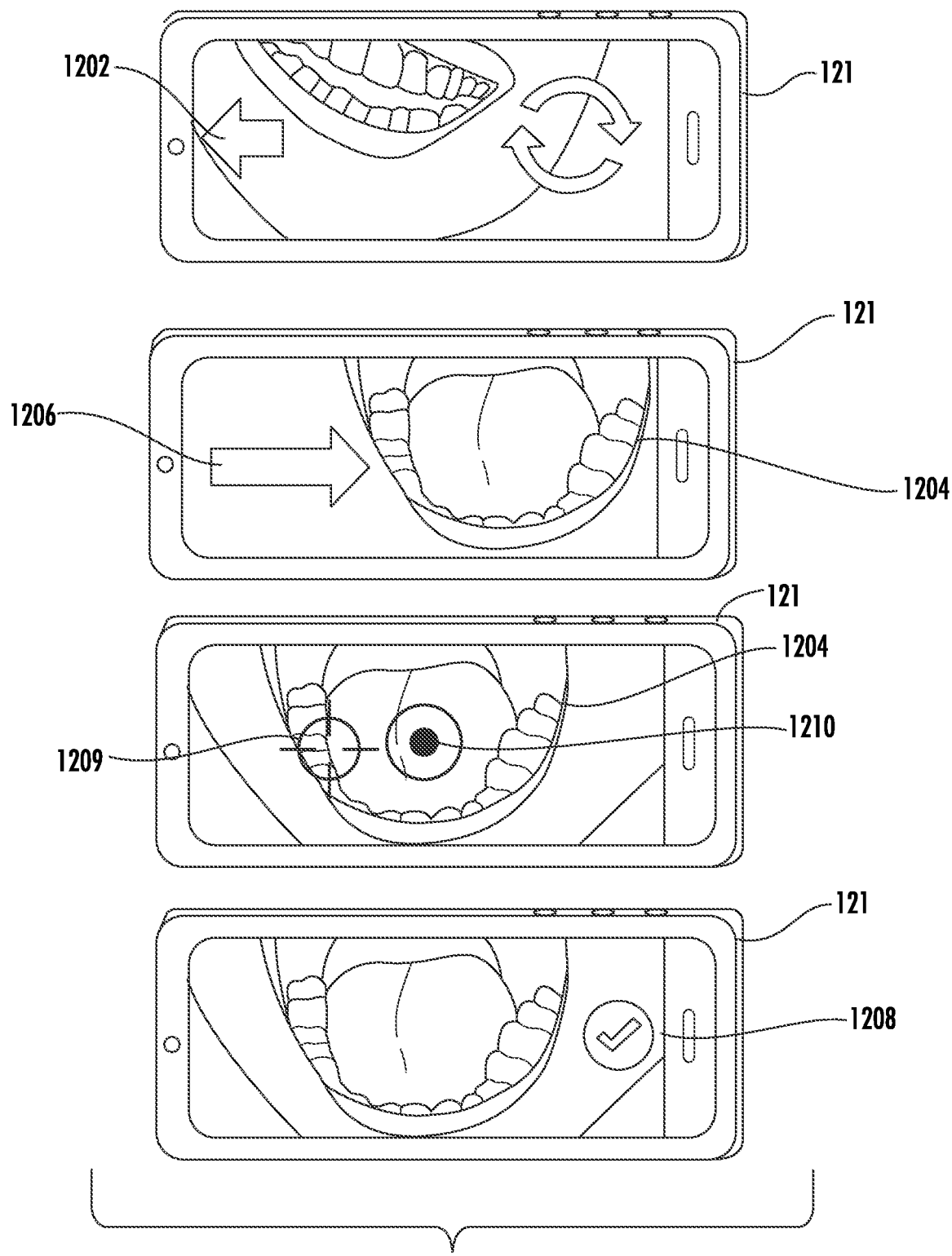
FIG. 12 is another illustration of interactive communication resulting from the implementation of the machine learning architecture of FIG. 5, according to an illustrative embodiment.

FIG. 12 is an illustration of the interactive communication resulting from the implementation of the machine learning architecture of FIG. 5, according to another illustrative embodiment. The image capture application 125 receives a continuous data stream (e.g., video data). The image capture application 125 parses the video data into frames and analyzes the frames of the video as if the frames were images. Frames are applied to the machine learning architecture 506. The quality of the frame (image) is evaluated by the image quality evaluator 508 (implemented using the image quality circuit 133) to determine whether the image characteristics satisfy the image quality thresholds associated with the image characteristics. The image quality evaluator 508 determines that the image characteristics satisfy the image quality thresholds associated with the image characteristics. The quality of the image is also evaluated using the protocol satisfaction evaluator 510 (implemented using the protocol satisfaction circuit 106) to determine whether the image content satisfies the image quality threshold associated with the image content. The protocol satisfaction evaluator 510 determines that the image is not a high quality frame based on the image quality score not satisfying an image quality threshold associated with the image content. Accordingly, feedback selector 512 (implemented using the feedback selection circuit 105) selects feedback to be communicated to the user via interactive feedback provider 514. As shown, feedback 1202 is displayed to the user 120.

In one embodiment, as shown in image 1204, the user 120 responds to the feedback 1202 by opening the user's mouth more, shifting the position of the mouth, adjusting the angle of the mouth, and moving the user device 121 farther away. Continuous streams of data are analyzed by the image capture application 125 resulting in new feedback 1206.

In another embodiment, as shown in image 1204, feedback 1202 can be provided to the user 120 by displaying one or more objects (or symbols, colors) such as a crosshair 1209 and a target object 1210, which are displayed on the user interface of the user device 121. The objects may be any of one or more colors, transparency, luminosity, and the like. For example, crosshair 1209 may be a first color and target object 1210 may be a second, different color. In some embodiments, only one object/symbol may be displayed to the user 120 (e.g., only crosshair 1209 or target object 1210). In other embodiments, both objects/symbols are displayed to the user 120 such that the user 120 is guided to match the objects (e.g., overlay crosshair 1209 onto target object 1210). Continuous streams of data are analyzed by the image capture application 125 resulting in adjusted/moved crosshair 1209 positions and/or target object 1210 positions.

The crosshairs 1209 and/or target object 1210 may prompt user 120 to adjust the size, distance, angle, and/or orientation of the user device 121 relative to the user 120 in such a way that the crosshair 1209 is moved toward the target object 1210. The crosshairs 1209 and/or target object 1210 may also prompt user 120 to adjust the user's head, mouth, tongue, teeth, lips, jaw, and the like, in such a way that the crosshair 1209 is moved toward the target object 1210. The target object 1210 can be positioned on the image 1204 relative to an area or object of interest. As the user 120 adjusts the device 121 and/or the user's body, the crosshair 1209 may be moved and positioned such that the adjustment of the user device 121 and/or user 120 by the user 120 increases the image quality score. Additionally or alternatively, the target object 1210 may be moved and positioned such that the adjustment of the user device 121 and/or user 120 by the user 120 increases the image quality score. In one example, the target object 1210 may change into a different symbol or object (e.g., feedback 1208). The target object 1210 may also change colors, intensity, luminosity, and the like. For example, at least one of the crosshair 1209 and target object 1210 may change as the objects become closer to overlapping or once the objects overlap a threshold amount. The crosshair 1209 and the target object 1210 can be overlaid onto the image 1204 using augmented reality methods. The one or more objects (e.g., crosshair 1209 and/or target object 1210) can be placed once or can be repeatedly adjusted during the image capture process.

The image capture application 125 continues to receive continuous data streams (e.g., video data). The image capture application 125 continuously parses the video data into frames and analyzes the frames of the video as images. Frames (images) are applied to the machine learning architecture 506. The quality of image is evaluated by the image quality evaluator 508 (implemented using the image quality circuit 133) to determine whether the image characteristic satisfies the image quality thresholds associated with the image characteristics. The quality of the frame is also evaluated by the protocol satisfaction evaluator 510 (implemented using the protocol satisfaction circuit 106) to determine whether the image content satisfies the image quality threshold associated with the image content. As shown, responsive to the feedback 1206, and based on the continuous adjustments of the user 120/user device 121, the image capture application 125 determines that a frame (image) of the continuous data stream satisfies the image quality thresholds (e.g., both the image quality thresholds associated with the image characteristics and the image quality thresholds associated with the image content). Indicator 1208 communicates to the user 120 that a high quality image has been captured. In some implementations, the image capture application 125 displays the captured high quality image to the user 120.

Feedback 1202 and 1206 communicate to the user 120 to adjust the size, distance, angle, and/or orientation of the user device 121 relative to the user 120. Accordingly, the feedback selector 512 is able to communicate multiple instructions to the user 120.

Referring back to FIG. 5, in some implementations, regardless of whether the threshold analyzer 511 determines that image quality thresholds are satisfied, the feedback selector 512 may be employed to select feedback (using the feedback selection circuit 105) for the user 120 based on the output of the image quality circuit 133 and/or the protocol satisfaction circuit 106. That is, feedback may be provided to the user before the image quality evaluator 508 and/or the protocol satisfaction evaluator 510 determine whether image quality thresholds associated with the image characteristics and/or the image content are satisfied.

The image quality evaluator 508 and protocol satisfaction evaluator 510 may be machine learning models applied to the same image 502 in parallel. In some implementations, the user device 121 may apply both the image quality evaluator 508 and protocol satisfaction evaluator 510. In other implementations, the user device 121 may apply one machine learning model (e.g., the image quality evaluator 508) and the server 110 may apply a second machine learning model (e.g., the protocol satisfaction evaluator 510).

Figure 13:
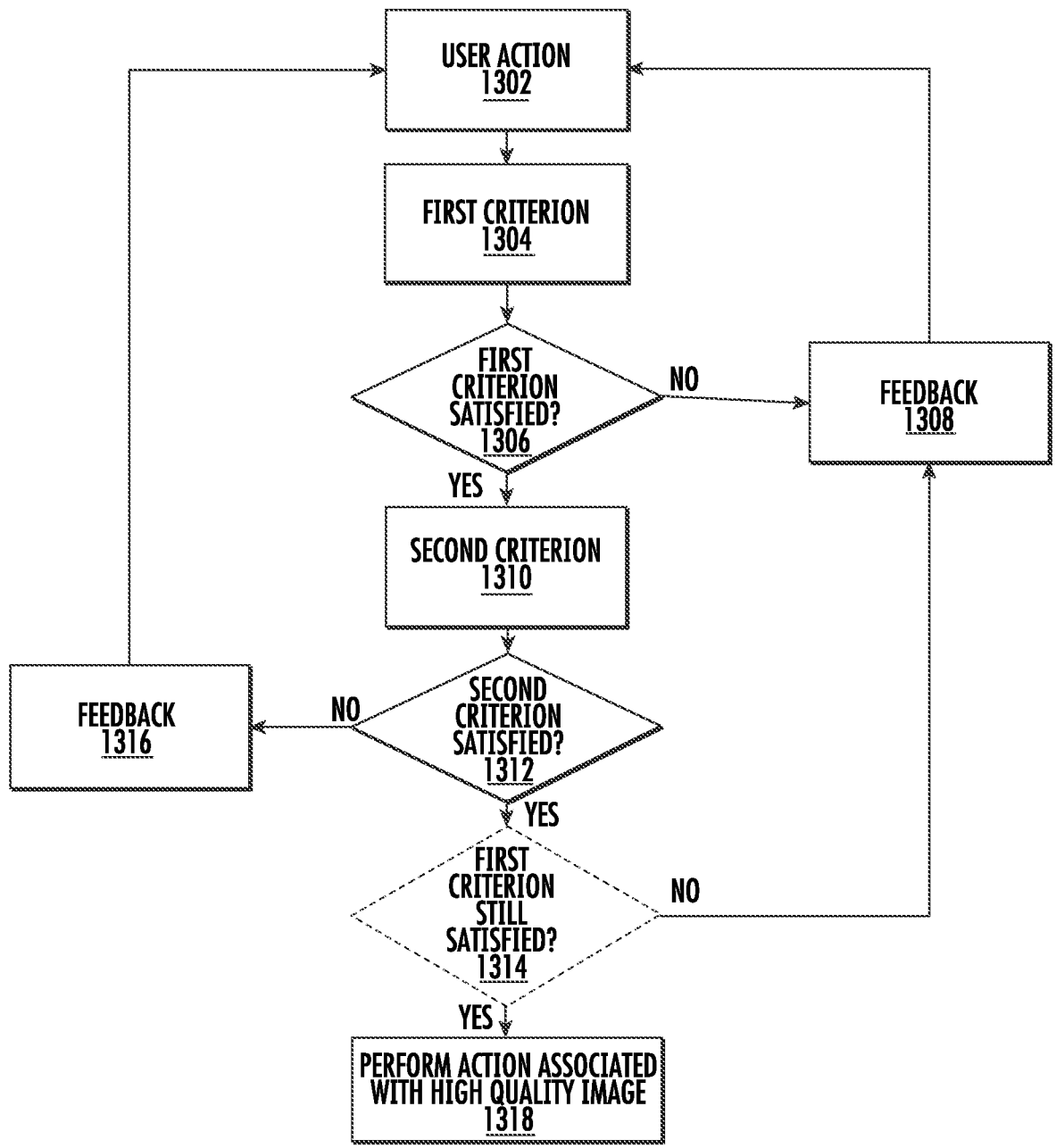
FIG. 13 is an example operational flow employing the machine learning models in series, according to an illustrative embodiment.

Additionally or alternatively, the image quality evaluator 508 and protocol satisfaction evaluator 510 may be applied to the image in series. For instance, the image quality evaluator 508 may evaluate the quality of the image using the image quality evaluator 508 and subsequently evaluate the quality of the image using the protocol satisfaction evaluator 510 (or vice-versa). FIG. 13 is an example operational flow employing the machine learning models in series, according to an illustrative embodiment.

Referring now to FIG. 13, at operation 1302, the user may perform an action such as initialize the image capture application 125 (e.g., 125A at the user device 121), capture an image, and/or a movement or adjustment (e.g., mouth position, tongue position, head position, mouth angle, lip position, tongue angle, head angle, and the like).

In some implementations, if the image capture application 125 is initialized, the image capture application 125 may instruct a camera on the user device 121 to activate upon the initialization of the image capture application 125. In other implementations, the image capture application 125 may prompt the user 120 to open the camera on the user device 121 upon the initialization of the image capture application 125.

In yet further implementations, if the image capture application 125A at the user device 121 is already initialized, the image capture application 125 (either at the user device 121 or the server 110) may capture an image in response to the user 120 action. For example, the user 120 may instruct the image capture application 125A to capture an image (e.g., by clicking a button or saying a capture command). Subsequently, the image capture application 125A will capture an image. In some embodiments, a timer is communicated (e.g., visually, on the display of the user device 121, or audibly) before the image capture application 125A instructs the camera to capture an image.

Additionally or alternatively, the image capture application 125A at the user device 121 may automatically capture a next image (or record using a video camera streams of data) after the user 120 has performed an action (e.g., moved). In some implementations, a sensor may be monitored by the image capture application 125 (either at the user device 121 or the server 110) to determine whether the user 120 has performed an action (e.g., moved). In other implementations, the image capture application 125A may wait a predetermined amount of time before capturing the next image. The image capture application 125 (either at the user device 121 or the server 110) may communicate a timer (e.g., visually, on the display of the user device 121, or audibly) before the image capture application 125A automatically instructions the camera to capture an image.

The image capture application 125 may receive one or more images in response to the activation of the camera. In some embodiments, video data, in the form of a continuous data stream received from the camera, may be analyzed by the image capture application 125. In other embodiments, the image capture application 125 may instruct the user 120 to capture a first baseline image. For instance, the user 120 may be prompted (prompted using audio and/or text displayed on the user device) to capture an image of the user smiling.

At operation 1304, a machine learning model may be employed to determine an image quality score associated with a first criterion. For example, the quality circuit 133 may determine an image quality score with respect to image characteristics (e.g., motion artifacts, blur, brightness, contrast, sharpness). At operation 1306, the image capture application 125 may determine whether the first criterion is satisfied based on the results of the first machine learning model (e.g., image quality circuit 133). In some implementations, the image capture application 125 may determine whether a portion of the image satisfies the first criterion, as described with reference to FIG. 14. If the first criterion is not satisfied, then relevant feedback may be determined at operation 1308. For example, the feedback selection circuit 105 may select user feedback based on the results determined by the image quality circuit 133. If the first criterion is satisfied, then the flow may proceed to operation 1310.

At operation 1310, a second machine learning model may be employed to determine an image quality score associated with a second criterion. The second machine learning model can be a different machine learning model than the first machine learning model. For example, the protocol satisfaction circuit 106 may determine an image quality score with respect to the image content (e.g., whether enough teeth are showing, whether the mouth is in the right position). The second machine learning model can also be the same machine learning model as the first machine learning model.

At operation 1312, the image capture application 125 may determine whether the second criterion is satisfied based on the results of the second machine learning model (e.g., protocol satisfaction circuit 106). In some implementations, the image capture application 125 may determine whether a portion of the image satisfies the second criterion, as described with reference to FIG. 14. If the second criterion is not satisfied, then relevant feedback may be determined at operation 1316. For example, the feedback selection circuit 105 may select relevant user feedback based on the results of the protocol satisfaction circuit 106. If the second criterion is satisfied, then the flow may proceed to operation 1318. That is, the flow proceeds to operation 1318 when both of the criteria have been determined to be satisfied (with respect to the image or a portion of the image). There may be more criteria or fewer criteria than the criterion described. For example if there are two criteria (as shown) then the flow proceeds to the operation 1318 when both the first criterion and the second criterion have been determined to be satisfied (with respect to the image or a portion of the image) at operations 1306 and 1312 respectively. In some embodiments, before proceeding to operation 1318, the image capture application may re-evaluate whether the first criterion is still satisfied at operation 1314.

At operation 1318, the image capture application 125 may perform an action associated with the high quality image. For example, if the data received by the first machine learning model was a continuous stream of data (e.g., a video feed), then the image capture application 125 may select the frame identified as the high quality image and store the frame/image in memory 119.

Additionally or alternatively, subsequent processing may be performed using the high quality image. For example, the image capture application 125 may compress the image (or otherwise transform/modify the image) or apply additional machine learning models to the image (e.g., subsequent object detection models). The image capture application 125 may also transmit the high quality image to the server 110 for further processing (e.g., to execute a next machine learning model to evaluate the same and/or different criteria, to execute a machine learning model to generate a parametric model from 2D data, to generate a treatment plan for the user 120, and the like).

Figure 14:
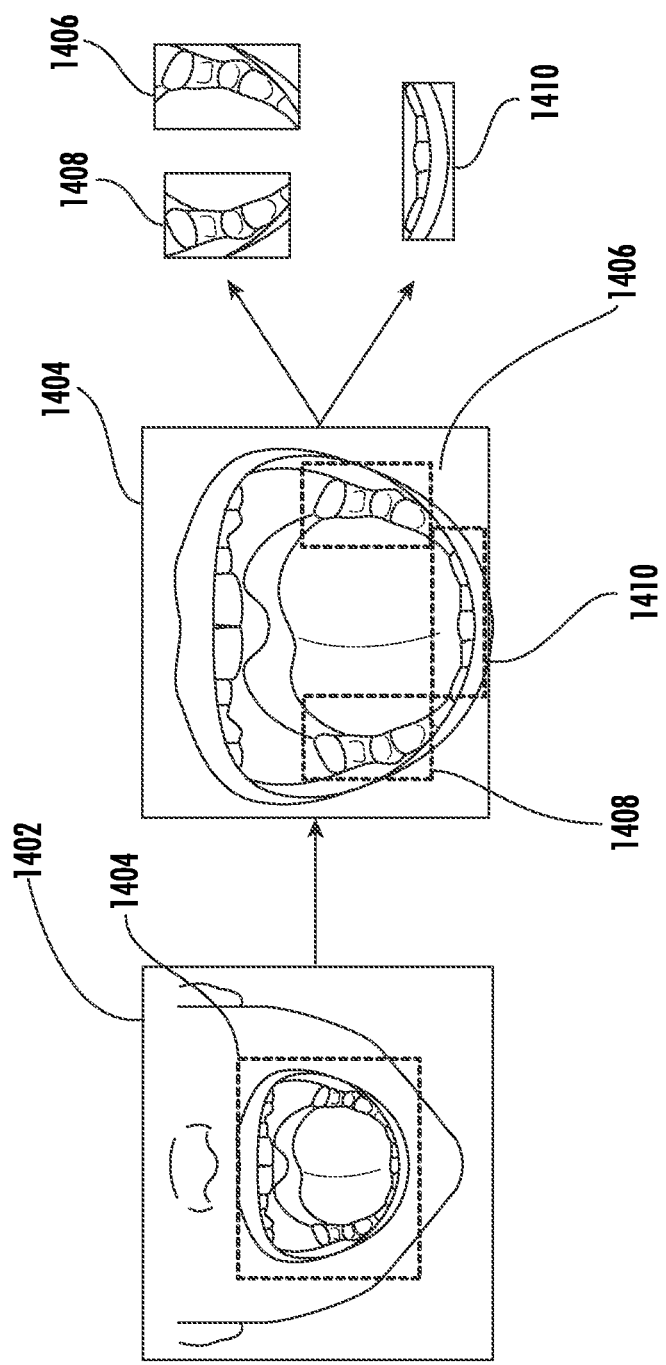
FIG. 14 is an illustration of a process for transmitting one or more portions of high quality images for further processing and discarding one or more portions of low quality images, resulting from the implementation of the machine learning architecture of FIG. 5, according to an illustrative embodiment.

In some implementations, one or more portions of the image may satisfy both the first and second criteria and be transmitted for further processing. That is, portions of the image that do not satisfy both the first and second criteria (e.g., have a low quality image score) may be discarded. Accordingly, only selected areas that are associated with specific image quality scores may be sent for further processing, while other areas having a low image quality score may be discarded. FIG. 14, as described herein, illustrates an example process for selecting and transmitting some areas of an image for further processing. Transmitting one or more portions of the image that satisfy both the first and second criteria may reduce the data size (e.g., data packets) and memory needed to perform the subsequent processing steps. For example, processing power and other computational resources are not consumed on portions of the image that are identified as low quality.

In some embodiments, the frequency of the first machine learning model receiving input (e.g., evaluating the first criterion at operation 1304) is higher than the second machine leaning model receiving input (e.g., evaluating the second criterion at 1310). For example, the image capture application 125 may generate feedback to improve the image with respect to the first criterion before attempting to improve the image with respect to the second criterion. Accordingly, the first machine learning model may be performed more often than the second machine learning model because the second machine learning model is executed in the event the first criteria is satisfied. As discussed herein, the first criterion may be criterion associated with image characteristics (e.g., determined using the image quality circuit 133) and the second criterion may be criterion associated with image content (e.g., determined using the protocol satisfaction circuit 106).

Additionally or alternatively, the first criterion may be criteria associated with the image quality, where the image quality includes both the characteristics of the image and the content of the image. That is, both the image quality circuit 133 and the protocol satisfaction circuit 106 may be employed by a first machine learning model (e.g., machine learning architecture 506 in FIG. 5) to determine whether the image quality satisfies a threshold.

The second criterion may be criteria associated with different machine learning models/architectures in downstream applications (e.g., generating a parametric model). For example, the image capture application 125 may transmit data to the server 110 in response to determining that the received image is a high quality image. Subsequently, the server 110 may execute one or more downstream applications using one or more other machine learning models/architectures to evaluate the second criterion. The second machine learning model associated with evaluating the second criterion is employed at a frequency less than first machine learning model/architecture associated with evaluating the first criterion at operation 1304.

FIG. 14 is an illustration of a process for transmitting one or more portions of high quality images for further processing and discarding one or more portions of low quality images, resulting from the implementation of the machine learning architecture of FIG. 5, according to an illustrative embodiment. The image capture application 125 may receive an image 502 as shown in 1402. The image capture application 125 may identify (e.g., using an object detection algorithm performed during an image preprocessing operation at 504) a mouth 1404 in the image 1402. As shown, a boundary box may be placed around the identified mouth 1404.

In some implementations, only the relevant portion of the image 1502 may be ingested by the image capture application 125 and applied to the machine learning architecture 506. For example, only the mouth 1404 may be processed by the machine learning architecture 506. The quality of the mouth 1404 is evaluated by the image quality evaluator 508 (implemented using the image quality circuit 133) to determine whether the characteristics of the mouth 1404 satisfy one or more thresholds. As shown, the image quality evaluator 508 determines that three portions (or parts, or regions) of the mouth 1404 (portion 1406, portion 1408, and portion 1410) satisfy the image quality threshold associated with the image characteristics. For example, the three portions 1406, 1408 and 1410 are shown to be well lit.

In some implementations, only portions 1406, 1408 and 1410 are ingested by the protocol satisfaction evaluator 510 (implemented using the protocol satisfaction circuit 106) to determine whether the portions 1406, 1408 and 1410 satisfy one or more thresholds. In other implementations, the mouth 1404 may be ingested by the protocol satisfaction evaluator 510 to determine whether the mouth 1404 satisfies one or more thresholds. In yet other implementations, the image 1402 may be ingested by the protocol satisfaction evaluator 510 to determine whether the image 1402 satisfies one or more thresholds.

The protocol satisfaction evaluator 510 may determine that portions 1406 and 1408 are high quality portions of the mouth 1404 based on the image quality score satisfying an image quality threshold associated with the image content. Additionally or alternatively, if the protocol satisfaction evaluator 510 receives the mouth 1404 or the image 1402, the protocol satisfaction evaluator 510 may identify portions 1406 and 1408 as high quality portions. By definition, other portions of the mouth 1404 and/or image 1402 may not be high quality portions (including portion 1410). In the example, the protocol satisfaction evaluator 510 may determine that portion 1410 is not a high quality image because not enough teeth are visible in the image 1402.

In some implementations, because portions 1406 and 1408 satisfy both the image quality evaluator 508 and the protocol satisfaction evaluator 510, portions 1406 and 1408 may be transmitted to a downstream application 516. As shown, portion 1410 may be discarded (or not further processed).

As a result of some portions of the image 1404 (e.g., portions 1406 and 1408) being determined to be high quality images and some portions of the image 1402 being determined to be low quality images, the feedback selector 512 (implemented using the feedback selection circuit 105) may select feedback to be communicated to the user 120 via interactive feedback provider 514. However, the feedback selected may be weighted or biased to address (or improve) the one or more portions of the image that did not satisfy a high image quality threshold. For instance, because the portions 1406 and 1408 of the mouth 1404 were identified as being high quality portions of the image 1402 (e.g., satisfying both the image quality threshold associated with the image characteristics and the image quality threshold associated with the image content), then the feedback selector 512 may select feedback associated with improving the quality of other areas of the image 1402 (e.g., portion 1410). In some implementations, the feedback selection circuit 105 may decrease the weighting/bias for selecting feedback associated with improving some areas of the image 1402, like portions 1406 and 1408, because both portions 1406 and 1408 have already been identified as being a high quality portion of the image. Accordingly, the high quality portion (s) of the image may be stored in memory 119. The feedback selection circuit 105 may also increase the weighting/bias for selecting feedback associated with improving other areas of the image 1402, like portion 1410, because the area of the mouth 1402 bounded by portion 1410 has not been captured in a high quality image. That is, the feedback selector 512 may select feedback that instructions the user 120 to capture a next image that may improve the image quality score associated with one portion of the image (e.g., portion 1410) at the cost of other portions of the image (e.g., portions 1406 and 1408) based on the weighting/bias.

The embodiments described herein have been described with reference to drawings. The drawings illustrate certain details of specific embodiments that provide the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

It is noted that terms such as "approximately," "substantially," "about," or the like may be construed, in various embodiments, to allow for insubstantial or otherwise acceptable deviations from specific values. In various embodiments, deviations of 20 percent may be considered insubstantial deviations, while in certain embodiments, deviations of 15 percent may be considered insubstantial deviations, and in other embodiments, deviations of 10 percent may be considered insubstantial deviations, and in some embodiments, deviations of 5 percent may be considered insubstantial deviations. In various embodiments, deviations may be acceptable when they achieve the intended results or advantages, or are otherwise consistent with the spirit or nature of the embodiments.

Example computing systems and devices may include one or more processing units each with one or more processors, one or more memory units each with one or more memory devices, and one or more system buses that couple various components including memory units to processing units. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated modules, units, and/or engines, including processor instructions and related data (e.g., database components, object code components, script components, etc.), in accordance with the example embodiments described herein.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure may be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A system comprising:
    a capture device configured to capture a first image representing at least a portion of a mouth of a user;
    a communication device configured to communicate user feedback to the user using a display; and
    a processor and a non-transitory computer-readable medium containing instructions that when executed by the processor causes the processor to perform operations comprising:
        receiving the first image representing at least the portion of the mouth of the user; and
        outputting user feedback for capturing a second image representing at least a portion of the mouth of the user, wherein the user feedback is output in response to using a machine learning architecture to determine that an image quality score of the first image does not satisfy an image quality threshold, the user feedback comprising matching, using the display, a first object overlaid on top of the first image representing at least the portion of the mouth of the user to a second object overlaid on top of the first image representing at least the portion of the mouth of the user.

2. The system of claim 1, wherein the capture device is further configured to stream a video, the video comprising a plurality of frames, at least one of the frames representing the portion of the mouth of the user.

3. The system of claim 2, wherein the processor is further configured to perform operations comprising automatically identifying a frame of the plurality of frames as a high quality image, the frame being identified as the high quality image in response to determining via the machine learning architecture that the image quality score of the frame satisfies the image quality threshold.

4. The system of claim 1, wherein the communication device is configured to communicate user feedback to the user using audio.

5. The system of claim 1, wherein the communication device is configured to communicate user feedback to the user using haptic feedback.

6. The system of claim 1, wherein the capture device comprises a light, the capture device configured to activate the light in response to the user feedback.

7. A computer-implemented method comprising:
    receiving, by a machine learning architecture executing on one or more processors, a first image representing at least a portion of a mouth of a user;
    determining, by the machine learning architecture, user feedback for outputting to the user, wherein the user feedback is determined based on a machine learning model of the machine learning architecture, the machine learning model trained by calculating a reward in response to an action and a policy; and
    outputting, by the machine learning architecture, the user feedback, the user feedback for capturing a second image representing a portion of the mouth of the user, wherein the machine learning architecture outputs the user feedback in response to an image quality score of the first image not satisfying an image quality threshold.

8. The computer-implemented method of claim 7, wherein the image quality score comprises at least one of an image quality score with respect to an image characteristic or an image quality score with respect to image content.

9. The computer-implemented method of claim 8, wherein the image quality score with respect to the image characteristic is determined using a machine learning model of the machine learning architecture, the machine learning model trained using a training dataset comprising a distorted image and a corresponding clean image.

10. The computer-implemented method of claim 8, wherein the image quality score with respect to image content is determined using a machine learning model of the machine learning architecture, the machine learning model trained using a class label to identify a class in a training image.

11. The computer-implemented method of claim 7, wherein the image quality score is used to predict at least one of a future image characteristic or a future image content.

12. The computer-implemented method of claim 7, further comprising:
    selecting, by the machine learning architecture, a user feedback phrase, the user feedback phrase being output to the user as the user feedback, the user feedback phrase selected in response to a user feedback type output from the machine learning model, the user feedback phrase selected from a dictionary of phrases.

13. The computer-implemented method of claim 7, further comprising:
    receiving, by the one or more processors, a video comprising a plurality of frames, at least one of the frames representing the portion of the mouth of the user; and
    extracting, by the one or more processors, the at least one frame representing the portion of the mouth of the user as the first image.

14. The computer-implemented method of claim 7, further comprising:
    receiving, by the machine learning architecture, the second image representing at least the mouth of the user;
    causing, by the machine learning architecture, the second image to be provided to a server in response to an image quality score of the second image satisfying the image quality threshold.

15. The computer-implemented method of claim 7, wherein the machine learning architecture executes on one or more processors of a device, and wherein the first image is captured by the device.

16. The computer-implemented method of claim 7, wherein the machine learning architecture executes on one or more processors of a server, and wherein the first image is captured by a device of the user.

17. The computer-implemented method of claim 7, further comprising:

receiving, by the machine learning architecture, another image representing at least a portion of the mouth of the user; and outputting, by the machine learning architecture, user feedback in response to an image quality score of the another image satisfying the image quality threshold.

18. The computer-implemented method of claim 7, further comprising:

receiving, by the machine learning architecture, a third image; and outputting, by the machine learning architecture, user feedback in response to determining via the machine learning architecture that the third image does not represent at least a portion of the mouth of the user.

19. A system comprising:

a communication device configured to capture a first image representing at least a portion of a mouth of a user and communicate the first image to a server; and a processor of the server and a non-transitory computer-readable medium containing instructions that when executed by the processor causes the processor to perform operations comprising:

receiving the first image representing at least the portion of the mouth of the user;

selecting, using a machine learning architecture, a user feedback phrase, the user feedback phrase selected in response to a user feedback type output from a machine learning model, the user feedback phrase selected from a dictionary of phrases; and communicating, to the communication device, user feedback for capturing a second image representing at least a portion of the mouth of the user, wherein the user feedback is determined in response to determining via an imaging protocol algorithm that an image quality score of a portion of the first image does not satisfy an image quality threshold, wherein the user feedback comprises the user feedback phrase.

20. The system of claim 19, wherein the instructions when executed by the processor further cause the processor to transmit a command to the communication device using an application programming interface.

21. The system of claim 19, wherein the server communicates to the communication device using an application on the communication device supported by a corresponding application on the server.

22. The system of claim 19, wherein the instructions when executed by the processor further cause the processor to receive a second portion of the first image satisfying an image quality threshold.

23. The system of claim 19, wherein the instructions when executed by the processor further cause the processor to bias the user feedback to improve the portion of the first image that does not satisfy the image quality threshold.

* * * * *